(12) United States Patent
Kleingon

(10) Patent No.: US 8,966,435 B2
(45) Date of Patent: Feb. 24, 2015

(54) METHODS FOR SOFTWARE MASS PRODUCTION

(76) Inventor: Irina Kleingon, Petah Tiqwa (IL)

( * ) Notice: Subject to any disclaimer, the term of this patent is extended or adjusted under 35 U.S.C. 154(b) by 929 days.

(21) Appl. No.: 13/139,172

(22) PCT Filed: Jul. 21, 2010

(86) PCT No.: PCT/IL2010/000579
§ 371 (c)(1),
(2), (4) Date: Jun. 10, 2011

(87) PCT Pub. No.: WO2011/013116
PCT Pub. Date: Feb. 3, 2011

(65) Prior Publication Data
US 2011/0246960 A1   Oct. 6, 2011

Related U.S. Application Data

(60) Provisional application No. 61/228,548, filed on Jul. 25, 2009.

(51) Int. Cl.
G06F 9/44    (2006.01)
G06F 9/46    (2006.01)

(52) U.S. Cl.
CPC ........................................ G06F 8/10 (2013.01)
USPC ............ 717/104; 717/115; 709/217; 709/328

(58) Field of Classification Search
None
See application file for complete search history.

(56) References Cited

U.S. PATENT DOCUMENTS 6,529,948 B1 *   3/2003   Bowman-Amuah ......... 709/217
7,003,560 B1 *   2/2006   Mullen et al. ................. 709/223
7,140,000 B2 *   11/2006  Yucel .............................. 717/104
7,202,869 B2 *   4/2007   Tooley et al. .................. 345/473
8,112,413 B2 *   2/2012   Krishna et al. ................ 707/713
8,225,282 B1 *   7/2012   Massoudi et al. ............. 717/121
8,229,791 B2 *   7/2012   Bradley et al. .................. 705/22
8,621,428 B2 *   12/2013  Massoudi et al. ............. 717/106

(Continued)

OTHER PUBLICATIONS

International Search Report; PCT/IL2010/000579; mailed Dec. 20, 2010.

(Continued)

*Primary Examiner* — Don Wong
*Assistant Examiner* — Devayani R Talukdar
(74) *Attorney, Agent, or Firm* — Novak Druce Connolly Bove + Quigg LLP

(57) ABSTRACT

A model-oriented programming method for computer-based software system development and management. The method includes (a) obtaining the program problem specifications, (b) building a model of the software system, (c) segmenting the model into model segments, wherein each of the model segments is assigned to a programmer, (d) writing a code for each of the model segments, wherein the code implements the assigned model segment, (e) running a model-driven dry-run and upon detection of a model error fixing the error and proceeding with step (c), (f) debugging the code by each of the programmers and upon detection of a model error fixing the error and proceeding with step (c), (g) integrating the code corresponding to each of the model segments into a computer-based software system, and upon detection of a model error fixing the error and proceeding with step (c), and (h) delivering the integrated computer-based software to the client.

16 Claims, 28 Drawing Sheets

(56) References Cited

U.S. PATENT DOCUMENTS

| | | | |
|---|---|---|---|
| 8,650,535 B2* | 2/2014 | Lewis | 717/104 |
| 2003/0135842 A1 | 7/2003 | Frey | |
| 2003/0236926 A1* | 12/2003 | Malville et al. | 709/328 |
| 2004/0181780 A1 | 9/2004 | Shiu | |
| 2007/0074182 A1* | 3/2007 | Hinchey et al. | 717/136 |
| 2008/0005728 A1* | 1/2008 | Morris | 717/153 |
| 2009/0037197 A1* | 2/2009 | McCrae et al. | 705/1 |

OTHER PUBLICATIONS

Perlis, Alan J.; "Epigrams on Programming", Yale University, SIGPLAN Notices vol. 17, No. 9, Sep. 1982, pates 7-13.

Wikipedia : "Epigrams on Programming" retrieved from the internet: http://en.wikipedia.org/wiki/Epigrams_on_Programming; Apr. 6, 2014.

* cited by examiner

<http://www.cioupdate.com/reports/article.php/1563701/Software-Project-Failure-The-Reasons-The-Costs.htm>

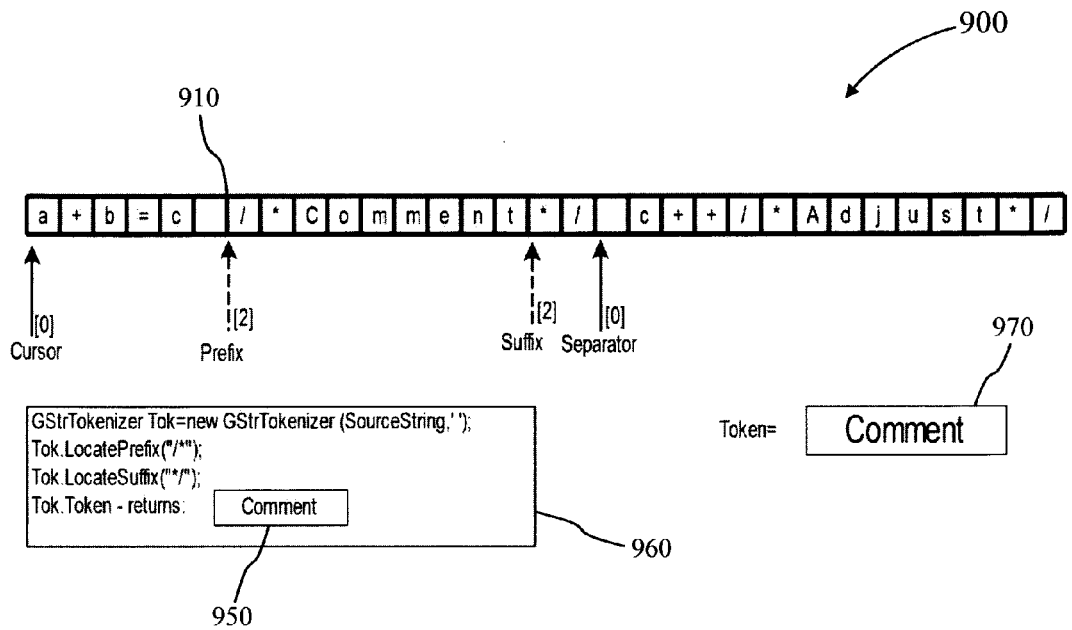
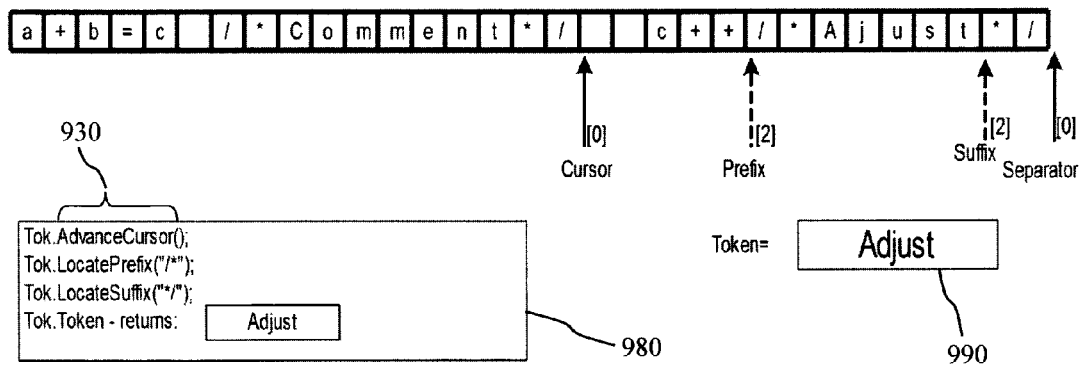
Fig. 11

```
public class TSpecializedClerkThreadMaster : GThreadMaster
{
    private int _Interval;
    private int _Specialization;
    private TGuiUpdatingThreadMaster _GuiUpdatingThreadMaster;

public override void Execute()
    {
        Thread.Sleep(1000);
        _GuiUpdatingThread=this.ThreadingManager.GetThreadMaster
                    ("GuiUpdating",this.NumericId) as TGuiUpdatingThreadMaster;
        GMessage Message;
        while(true)
        {
            Message=this.Receive();                       3140
            if(Message.StringId=="Pause")
                Pause();
            else if (Message.StringId=="SetInterval")
                _Interval=Message.NumericId;
            else if(Message.StringId=="SetSpecialization")      3150
                _Specialization=Message.NumericId;
            else if (Message.StringId=="InfoMessage")
                this.Send(_GuiUpdatingThreadMaster,Message);
            Thread.Sleep(_Interval);
        }
    }
    public override bool UDM_ConfirmTransfer(GMessage MessageToTransfer, GMessage
                                AcceptedMessage, string ConfigString)
    {
        return _Specialization>0 && _Specialization==MessageToTransfer.NumericId;
    }
    public override bool UDM_ConfirmRedirect(GMessage Message, string ConfigString)
    {
        return _Specialization>0 && _Specialization==Message.NumericId;
    }
    public override bool UDM_AllowTransfer(GMessage AcceptedMessage, string
                                                        ConfigString)
    {
        return true;
    }
}
```

```
public class TClerksTeam:GThreadingTeam
{
    public TClerksTeam(string Name, int Number):base(Name,Number)
    {
    }
    public override bool UDM_AllowRedirect(GMessage Message, string ConfigString)
    {
        return true;
    }
}
```

*Fig. 28*

METHODS FOR SOFTWARE MASS PRODUCTION

FIELD OF THE INVENTION

The present invention relates to software lifecycle and particularly to a model based method for efficient development and maintenance of software throughout the software lifecycle.

BACKGROUND OF THE INVENTION

The software industry if often described as no less than chaotic. Furthermore, the present situation in the software industry lacks investment transparency and responsibility to customer/investor. Often, software industry is not possible to guarantee profits.

Furthermore, the software industry is characterized by overtime working personal, since there is no mechanism for enforcement of employees except for working hours. There is no effective mechanism to control employees because there are no objective (unprejudiced) criteria for development time period estimation. As a result, the attraction of profession of programmer and qualification of programmers are being reduced and the industry work quality is being degraded.

The Standish Group International, Inc. is a market research and advisory firm specializing in mission-critical software and electronic commerce. The Standish Group collects information related to software projects successes and failures since 1994 and issues an annual "Chaos Report". Reference is made to FIG. 1, which drawing graphically illustrates the results of the investigations of the Standish Group for the year 2004: only 29% of software projects have succeeded, while 53% were challenged and 19% failed. Over the years, no positive trend can be recognized. FIG. 2 graphically illustrates the research results presented at the CIO Update site, which graph represents the ratio of positive and negative return of investments (ROIs) of software projects. Curve 20 depicts exponential rise of cost of subsequent new features added to the program. Line 22 depicts money income. Interval 24 represents temporary positive ROI, which positive ROI exists until the costs arise over money income. Interval 26 represents negative ROI, which negative ROI replaces the positive ROI forever.

The CIO Update article further explains that the cause of software projects failures is the exponential growth of the work to be done in order to implement a change in the code of apparently the same complexity.

Reference is made to Wikipedia term "Iterative and Incremental development", which is defined as a cyclic software development process. Under "Implementation guidelines", it is described that implementation of the software being developed in an iterative development methodology, includes:

Any difficulty in design, coding and testing a modification should signal the need for redesign or re-coding.
Modifications should fit easily into isolated and easy-to-find modules. If they do not, some redesign is needed.
Modifications to tables should be especially easy to make. If any table modification is not quickly and easily done, redesign is indicated.
Modifications should become easier to make as the iterations progress. If they are not, there is a basic problem such as a design flaw or a proliferation of patches.
Patches should normally be allowed to exist for only one or two iterations. Patches may be necessary to avoid redesigning during an implementation phase.

Iterative development was initially formulated by James Martin in 1991 as part of his "Rapid Application Development" methodology. But no positive influence over software industry can be observed according to the chaos annual reports of Standish Group.

The citation shows that iterative development generally includes re-design and re-coding, just as the present invention recommends. However, iterative development does not provide clear and strict criteria for the situation when each step should be executed. It is important to notice, that there could not be a guarantee that redesign or re-coding will indeed improve the situation for improvement of which situation the step is taken.

In practice in most cases that redesign or re-coding is never done because the ongoing state a software project is usually unknown and uncontrolled. The situation is described, for example, in US patent application 2006282816, by Chungyang Chen, which states that one of the most difficult things about project management is unknown ongoing condition, status and quality during process.

The popular Agile methodology was introduced in 2001 and was derived from iterative development. However, the Agile manifesto either does not try to recognize the problem, but rather tries to give recommendations about preferred strategy in a given (chaotic) situation. The recommendations given by Agile methodology discuss what activities may be neglected for the sake of time saving. But the cost of neglecting of activities may easily overwhelm the savings. Problems are just postponed to the later stages.

FIG. 3 schematically exemplifies a common software project design. The software project includes a model 30, which model 30 is broken into model segments 32 after the code began to be written, wherein respective programmers 34 are team members each of which is assigned one model segments 32. Each programmer 34 has respective model segment 32 residing in the mind of the programmer as a respective memorized model segment 36. In the example shown in FIG. 3, programmer 34a is assigned model segment 32a and what is kept in the mind of the programmer is memorized model segment 36a. Likewise, programmer 34b is assigned model segment 32b and what is kept in the mind of the programmer is memorized model segment 36b, and programmer 34c is assigned model segment 32c and what is kept in the mind of the programmer is memorized model segment 36c.

As a programmer 34 reveals a problem in the respective designed model segment being assigned to the programmer, in most cases, programmer 34 does not formally reports the revealed problem to the team leader, but rather makes some decision on and goes on writing the code. All decisions made by programmers without reporting the problem to the leader of team of programmers are short-term decisions, and the short-term decisions transform the code into a spaghetti code.

As stated by Steve McConnell in "Code Complete" 2-nd edition p. 87, a function-level software model design is always done, though sometimes the design is done unconsciously and poor rather than consciously and well.

It should be noted that it does not matter if the code uses objects and seems to be object-oriented. If the objects are not composed into an integral logical system, the code is deformed into a spaghetti code.

Furthermore, some roots of the current software industry problems can be traced in the history of the industry. Typically the very first programs were designed using workflow diagrams. As the programs grew in size, it became very inconvenient to draw diagrams by pencil (there were no drawing software yet) and then, programmers started to design programs in mind.

As the volume of information to be processed went and grew, the code creation process moved into sub-cortex of the human's brain, because the sub-cortex is actually information processing unit having much higher productivity than the cortex.

The method of unconscious construction of the code worked less or more as long as each program was created by a single programmer. But now, the software industry faces a huge problem: poor communication between programmers and between programmers and other project participants, including customers. Poor communication is now commonly recognized as the major factor of software projects failure, but nobody has provided a practically feasible way how to improve communication between the software project members.

There is therefore a need and it would be advantageous to have a methodology that allows for performing design and coding consciously, and then it becomes realistic to require from programmers to communicate properly.

Object Oriented Programming (OOP) concept is acknowledged as a mainstream technique used for software development but there is no strict definition of what OOP is. Most programmers believe they are object oriented, while really the programmers have no clear idea of what OOP means. Here is a citation from OOP article appearing in Wikipedia: "Attempts to find a consensus definition or theory behind objects have not proven very successful, and often diverge widely."

The following is a definition which definition is strict enough for the purposes of the present invention: an object is a reflection/representation/abstraction of a single material or abstract or imaginable item one might want to represent in program. An object-oriented program is a program operating with objects. Object-oriented design (OOD) and/or OOP concepts state the following: "one should design his/her software system as a set of interacting objects and then implement the same objects in the code."

Technically, representation is implemented in object-oriented programming languages as data structure, representing the state of the source item, along with associated set of functions representing the behavior of the source item.

In order to reflect human's ability of abstract thinking, a number of additional technical features are implemented in object-oriented programming languages. The most basic of the features are concepts of class, encapsulation, inheritance and polymorphism. Named pair of data structure layout and set of functions is called class, wherein a data item is called member data of the class and the functions are called member functions of the class. In practice and science we tend to classify items in question. The classification items of the may be hierarchical. The hierarchical classification is implemented in object-oriented programming languages as inheritance. The concept of encapsulation emphasizes the fact that it is preferable, productive and safe to think about object as if the object is black box. Then the concept of object becomes simplification means which simplification means helps to analyze big system in the human's mind. The concept of polymorphism reflects the fact that people are able to recognize some abstract similarities in the behavior of real items belonging to different classes.

In all Object-Oriented languages, objects are instantiated as embodiments of some class. A class must be declared before one or more objects, representing instances of the declared class, can be created. Later in present document, for the sake of brevity, the terms "object" and "class" might be used interchangeably.

Furthermore, nobody exactly knows what actually could be expected from OOP. The truth is that OOP is great simplification means, which simplification means could help analyze large systems and write understandable code, but the "principle of minimal changes" cancels the advantages, promised by OOP.

The principle of minimal changes requires producing of subsequent versions of software system by doing minimal changes in the working code.

Multithreading

For now there is no feasible methodology of writing thread-safe code and all existing recommendation finish with the same sentence that multithreading issue is very difficult even for experts. Experts have no definite methodology as well.

There is a very important term: thread affinity of code and data. The point is that in order to be able to write thread-safe code it is required to be able to answer the following questions:

a) On what specific thread a code (function) is performed, or, in other words, within workflow (route of execution) of which thread the code (function) is performed.

b) What data does the code (function) changes and/or uses for reading.

Each thread has a purely sequential workflow.

Theoretically, each function might be called within workflow of any thread. Therefore, the same function might be performed several times concurrently on different threads.

Important notion: as it is spoken about object-oriented code, "the same function" means "the same function, called on the same object (instance of the class whose member the function is)".

The problem of thread unsafety is caused by concurrent usage of the same memory on different threads.

Not only the same function, but also different functions may use the same memory concurrently on different threads.

Reference is made to FIG. 4, which schematically illustrates a traditional technique of multithreaded coding. There are potentially shared memory items annotated as A, B and C, and two threads 40 and 42. Signs 51, 52 and 53 designate segments of code, using memory item A. Signs 61, 62 and 63 designate segments of code, using memory item B, and signs 71 and 72 designate segments of code, using memory item C.

Rectangles 55, 56 and 57 designate critical code sections which code sections, using memory item A, should be locked with the same locking object. Rectangles 65, 66 and 67 designate critical code sections which code sections, using memory item B, should be locked with the same locking object. Rectangles 75 and 76 designate critical code sections which code sections, using memory item C, should be locked with the same locking object.

Besides of just locking of the code, which code uses shared memory items, it is required to provide proper locking granularity (recognize the edges of the code to be locked) and proper critical sections nesting (inverted order of nesting represents potential deadlock).

Furthermore, it is required to plan usage of waiting system calls, because when a shared memory item changes on some thread of execution, other thread(s), interested in that item, should be notified about the change.

The described approach requires tracing of workflow of each thread and recognizing combinations of code fragments which fragments are performed on different threads and the fragments use the same memory. The work of recognition of combinations is the work of exponentially growing complexity.

SUMMARY OF THE INVENTION

The present invention provides method for computer-based software development and maintenance. The method covers software lifecycle as whole.

Very general thought underlying the present invention is to apply well-known and successful methodologies of creation of new things (for example, creation of new model of aircraft)—to the software development.

Present invention diagnoses current situation in the software industry as following: despite of the fact that design stage for decades is commonly acknowledged as important activity, in practice design decisions are not implemented, design documents become irrelevant shortly after the code starts to be written. Programmers still work according to the pattern: "transform functional requirements into working code".

The principle intentions of the present invention include providing a method for software development management using model-oriented programming (MOP) and middleware libraries.

An aspect of the MOP concept is to make accent on the relevance of the program code to the model. Term "model" means "product of design stage". Model plays very important role at each and every stage of development.

The present invention assumes that the system architect knows how to create the model, provided that system architect has the correct requirements.

The major problem is that there are contradicting and unrealistic requirements towards the system architect.

There are 3 major mistakes done in each and every software project:
  a) It is believed that system architecture could and should be created at once at the very first stage of the project, before coding starts. Actually the mistake is that the thought "We need it" is confused with the thought: "We are able to do it".
  b) The system architect is required to plan future changes. The requirement of planning future changes could be realistic requirement only when speaking about foreknown future changes.
  c) Principle of minimal changes in working code. As abiding by principle of minimal changes the code always reflects all the history of the code creation and the code would never implement design decisions. The code cannot reflect changing model and then the model stagnates or becomes irrelevant. The "traces of the history" in the code represent redundant confusing information. With time redundant information becomes prevalent and it becomes totally impossible to understand the code. Then the code dies and is cast away.

The intention of the present invention is to fix the described mistakes.

Furthermore, the present invention turns algorithms of exponentially growing complexity into algorithms of linearly growing complexity, for the following activities:
  a) The newly introduced debugging technique.
  b) The technique of serializations (locking) in the multi-threaded code.

Furthermore, the present invention includes middleware libraries containing simplification means as inseparable part of invented methods.

Middleware libraries influence design of software system and play very important role in quick and painless debugging and integration.

The present invention introduces the following important ideas:

a) Program code should not depend on the order of errors revealing and reflect all the history of changes in the code. Principle of minimal changes should be cancelled.
b) The only purpose of the system architect should be creation of the model which model should represent (partial and simplified) abstraction of reality, namely, of the problem to be solved.
c) The model, properly describing the problem in question, never could be created at once. The model should be iteratively improved. "Iteratively" does not mean "by minimal changes". Every model improvement should utilize all the knowledge acquired since previous iteration.
d) Model improvement should result in significant code changes. The code should keep consistence with the model.
e) Significant changes in the code can be affordable only if the debugging stage is rather quick and straightforward. Present invention introduces debugging technique which debugging technique turns debugging into straightforward and mechanical activity. Middleware libraries are very important means for new debugging technique implementation.
f) In MOP the model should be always relevant. The model serves criteria for each and every decision making.
g) Code is specific type of document—this is why the code should be understandable without running. Code should be self-explaining in the terms of the current version of the model.
h) The present invention introduces additional technique for revealing bugs in the code: visual verification—namely, dry-run. For now dry-run is used for design (algorithm) verification. According to the present invention programmer should read the constructed code many times, visually find logical errors and deliver the acquired knowledge for the next improvement of the model, if applicable.
i) Model-driven dry-run procedure is introduced instead of the existing functionality-driven dry-run. Model-driven dry-run enables to check model consistency and code correctness at early stages of development and prevents many errors. Model-driven dry-run means that self-explaining in the terms of the model code is checked for consistency with the model.
j) Model-driven debugging method is introduced instead the existing functionality-driven debugging. Model-driven debugging means that code is not checked for implementation of functional requirements—instead the code is checked for producing results predicted from the view point of the model. If the results differ—it means that whether code is not consistent with the model or the model itself is internally inconsistent and requires improvement.
k) When applying model-driven debugging method, the minimal unit of debugging should not be a path of execution from start up to exit. The minimal unit of debugging should rather be a short segment of the code. Especially, each logical expression should be debugged separately.
l) The leader of the team of programmers should understand all code written by members of the team of programmers. The leader of the team of programmers should take responsibility to the boss of the leader of the team of programmers and deliver the knowledge, acquired by members of the team of programmers, to the system architect. Since the code is self-explaining taking responsibility becomes realistic requirement.

m) If components of the software system developed by different programmers manage to keep relevance of the components to the model up to the moment when integration stage starts—then the components also keep ability to communicate and integration becomes much less painful.

n) In order to debug communicating components in parallel, yet before the integration starts—the present invention Text Parsing module introduces the parser for simplest scripting language named, by way of example, PARAS, which scripting language enables to easily simulate data of any type and any complexity. Set of scripts written in the PARAS language represent scenarios and enable to easily simulate the behavior of other component(s) and by doing so to debug each component separately, in parallel with other components.

o) Multithreading design should represent a part of the modeling stage. Multithreaded applications should be designed in terms of actors derived from the problem to be solved and terms of activity (behavior) of the actors.

p) Inter-thread communication should be designed in the terms of messaging between actors appearing in the model. When writing the code, the actors should be represented as objects of class GThreadMaster, supplied by middleware library, or of a class derived from GThreadMaster class. Class GThreadMaster along with the GThreadingTeam class implements debugged and tested code which code is responsible for safe inter-thread messaging.

q) Multithreading-related errors should be found using dry-run—not debugger. Debugger does not help to find errors related to the thread-unsafety of the code—the debugger rather hinders from recreation of the erroneous situation because all timing scenarios of the threads change drastically when application falls into breakpoint.

r) Memory management problems in C++ are solved in zero time using the module supplied for free along with middleware library provided by the present invention.

According to the teachings of the present invention, there is provided a MOP method for computer-based software system development and management. The MOP method of the present invention includes the steps of:

a) Obtaining the software program problem specifications;
b) building a model of the computer-based software system;
c) segmenting the model into model segments, wherein each of the model segments is assigned to a programmer;
d) writing a code for each of the model segments, wherein the code written by each programmer substantially implements the assigned model segment;
e) running a model-driven dry-run and upon detection of a model error fixing the detected model error and proceeding with step (c);
f) debugging the code by each of the assigned programmers and upon detection of a model error fixing the detected model error and proceeding with step (c);
g) integrating the code corresponding to each of the model segments into a computer-based software system, and upon detection of a model error fixing the detected model error and proceeding with step (c); and
h) delivering the integrated computer-based software to the client.

Preferably, the MOP method further includes a step of building list of terms (LOT) based on the problem specifications, wherein the building of the building of LOT is performed after obtaining of the software program problem specifications.

Preferably, the MOP method further includes a step of maintaining the delivered computer-based software system. Upon detection of a model error fixing the detected model error and proceeding with step (c).

An aspect of the MOP method of the present invention is to enforce a self-explanatory code.

Preferably, when the step of debugging the code is performed on a short segment of the code, the expected outcome of the segment is first obtained from the model. Model-driven runtime debugging requires debugging not path by path of execution of the program, but short segment by segment. The technique of debugging of short segments of code one by one is given for implementation when the model is kept up-to-date. Here the efforts for fixing and improving of the model begin to give reward.

A preferred aspect of MOP is to solve the problem of memory allocation and freeing in languages such as C++ in zero time using, for example, the module for automatic memory freeing supplied for free by the author of the present invention.

Preferably, the MOP method further includes a step of providing a middleware library, wherein the middleware library contains tools such as text parsing tools and tools for object-oriented design of multithreaded applications facilitating safe coding for multithreaded application. The multithreading module and a parser for script language, which script language allows for simulation of input data of any type and any complexity, are a preferred set of simplification means, implemented in the middleware library.

Optionally, the middleware library further includes a GStrTokenizer class facilitating the forming of a parser. The GStrTokenizer class encapsulates complex pointer Cursor and a complex pointer Separator, wherein the Cursor pointer points to the first symbol of a substring of an input string, wherein the token is searched starting from the first symbol of the substring, and wherein the Separator pointer points to the first symbol after the token or after markup substring after the token (if applicable).

Preferably, the GStrTokenizer class further encapsulates a complex pointer Prefix, wherein the Prefix pointer points to optional markup substring located before the token, and a complex pointer Suffix, wherein the Suffix pointer points to optional markup substring after the token. The GStrTokenizer class can serve as a simplification means for a wide range of script language parsers implementation.

Optionally, the middleware library further includes a universally usable multithreading infrastructure module, wherein the universally usable multithreading infrastructure module encapsulates all required locks for safe multithreading applications implementation. The universally usable multithreading infrastructure module is aimed at solving the problem of safe multithreading applications implementation by means of usage of a once-debugged universally usable multithreading infrastructure module.

Further in present document for the sake of brevity the term multithreading module will be used instead of the expression "universally usable multithreading infrastructure module, provided by the middleware library, which middleware library is provided by present invention".

The multithreading module includes classes facilitating representing real objects (persons, organizations, machines and the like) as personalized threads of execution in the multithreading applications.

Optionally, the multithreading module includes thread-safe module elements, such as:

a) a GThreadMaster class, wherein an object of the class derived from the GThreadMaster class is allocated for each thread of execution;

b) a GThreadingTeam class implementing a team-of-threads having a common message queue for all threads of execution, being members of the team-of-threads;

c) a GThreadingManager class, along with the GThreadingTeam class, facilitates performing a thread-safe "central post office registry" algorithm;

d) a thread-safe asynchronous messaging interface, wherein when using the messaging algorithm the thread sending a message never stacks;

e) a Send( ) function for messages sending;

f) a Receive( ) function for messages reception;

g) a thread-to-thread asynchronous message sending; and h) a thread-to-team asynchronous message sending, wherein further in present document the object of GThreadMaster class or derived from the GThreadMaster class will be mentioned as thread master, the object of GThreadingTeam class or derived from the GThreadingTeam class will be mentioned as threading team and the object of the GThreadingManager class or derived from the GThreadingManager class will be mentioned as threading manager.

The thread master implements a private queue of messages that are sent to the thread of execution for which thread of execution the thread master is allocated. The threading team implements a queue for queuing messages sent by a thread of execution to the team-of-threads. The threading team itself cannot receive a message. There is no thread of execution associated with threading team. Each message should be finally received by a thread of execution, specifically—by the thread master allocated for that thread of execution. A message queued onto the queue of a threading team, will be received later by one of the threads of execution, the threads being members of the threading team.

Optionally, the Send( ) function includes a redirection feature (feature being the ability to perform a task), wherein the redirection feature facilitates a thread of execution, the thread of execution being a member of the team-of-threads, which team-of-threads is specified by sending thread to be a target (addressee) of the sent message, to redirect the message designated to the team-of-threads, and queue the message onto a private queue of the member thread of the team-of-threads.

Optionally, the Receive( ) function includes a customization feature, wherein the customization feature facilitates setting the order in which messages are retrieved from the private queue and/or from the queue of team-of-threads.

Optionally, the GThreadMaster class includes a sorted queue feature, wherein the sorted queue feature declares a private queue of a thread master as being sorted.

Optionally, the Receive( ) function includes a preprocess feature, wherein the preprocess feature facilitates additional looping over the message queue before any message can be selected for retrieval.

Optionally, the Receive( ) function includes a transfer feature, wherein the transfer feature, after a message is selected from the message queue of the team-of-threads for retrieval by the Receive( ) function called on a thread-member of the team-of-threads, the transfer feature facilitates immediate moving of additional messages from the message queue of the team-of-threads to a private queue of the thread-member of the team-of-threads logically grouping the additional messages along with the message selected for retrieval. As result, the logically grouped messages are treated on the same thread and other members of the team-of-threads are not able to retrieve the transferred (added to the logical group after the first message) messages later from the queue of the team-of-threads.

Optionally, the GThreadMaster class and GThreadingTeam class include a set of virtual functions, wherein the virtual functions can be overridden by a user of the multithreading module, wherein the overriding of the virtual functions provides the user with a full control over the redirection, customization, transfer and preprocess features, implemented within the Send( ) and Receive( ) member functions of GThreadMaster class.

BRIEF DESCRIPTION OF THE DRAWINGS

The present invention will become fully understood from the detailed description given herein below and the accompanying drawings, which drawings are generally not drawn to scale and are given by way of illustration only and thus, not limitative of the present invention, and wherein:

FIGS. 10-11 illustrate example use cases utilizing the GStrTokenizer class, implemented by the text parsing module of the middleware library of present invention.

FIG. 28 is code snippet implementing one of actors of multi-threading scenario shown in the FIG. 15.

DETAILED DESCRIPTION OF THE INVENTION

The present invention now will be described more fully hereinafter with reference to the accompanying drawings, in which drawings show preferred embodiments of the invention. Present invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which the present invention belongs. The methods and examples provided herein are illustrative only and not intended to be limiting.

By way of introduction, the principle intention of the present invention includes providing a method of software development management using model-oriented programming (MOP) and middleware libraries, containing simplification means. The middleware libraries influence the design of software system and play very important role in quick and painless debugging and integration. An aspect of the present invention is to maintain an up to date model of the software system throughout the life cycle of the system.

Figure 6:
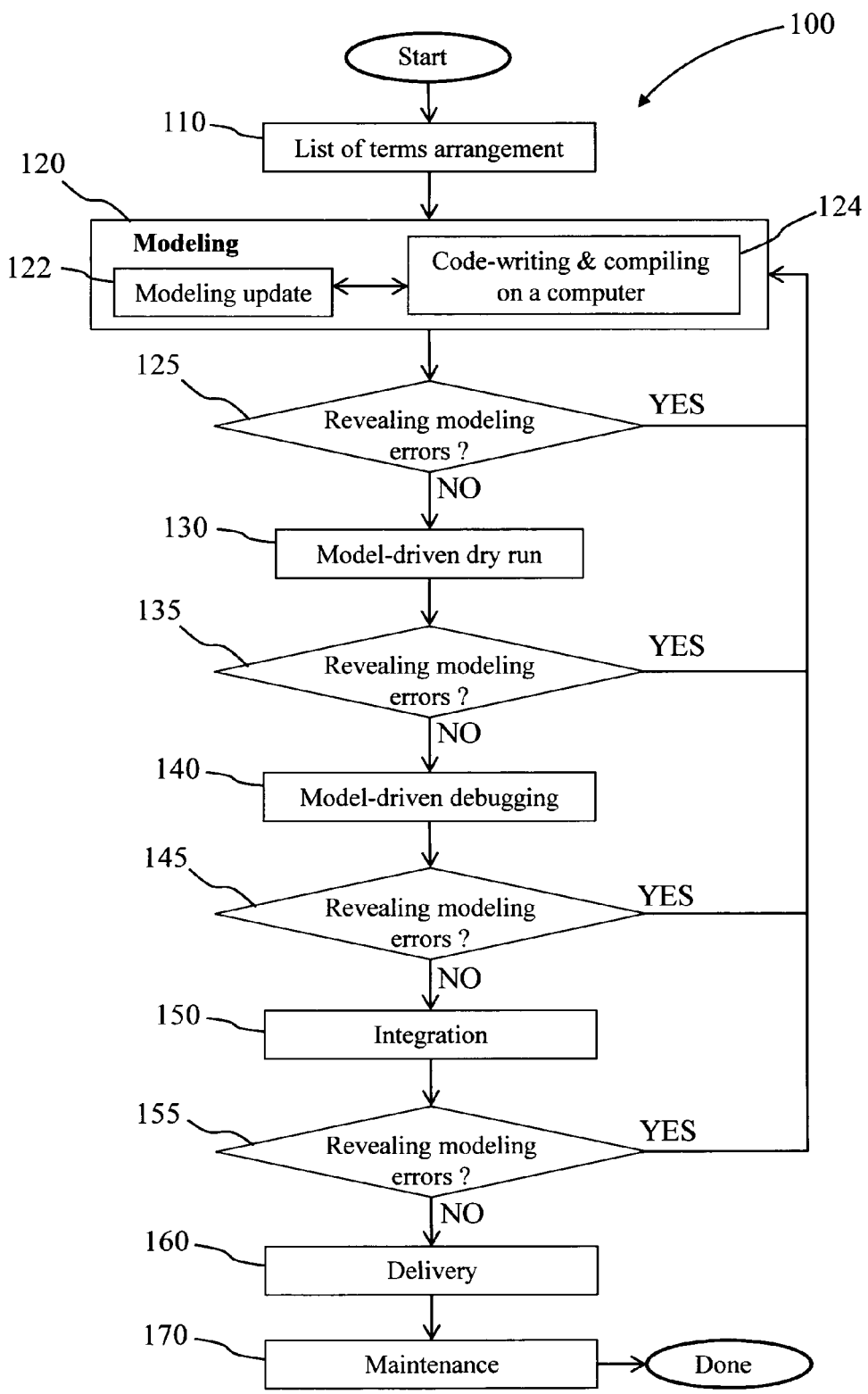
FIG. 6 is a flow chart of the steps of a software production management method, according to embodiments of the present invention.

Reference is now made to FIG. 6, which drawing represents a flow chart of the steps of a software production management method 100, according to embodiments of the present invention. Method 100 includes the following steps:
Step 110: List of Terms (LOT) is Arranged After Obtaining the Software Program Requirements.

The software program requirements contain algorithms, objectives, parameters, etc. The LOT should include all meaningful terms appearing in the requirements along with the strict definitions of the terms.

The members of the team of programmers should be forced to strictly define meanings of all the terms.

The LOT should be clearly correlated with a specific version of the model and code.

The verbal explanations using strictly defined terms represent important aspect of modeling and coding technique.
Step 120: Modeling.

MOP replaces both top-level design and detailed design stages of prior art methodology with a single stage—modeling.

The purpose of the prior art design stage is to provide a "mechanism" or "scenario" which "mechanism" or "scenario" seems to provide the required functionality.

According to present invention, any computer-based software system is viewed as an abstract model of reality. The model is always partial and always simplified.

As a person starts to create the model the person usually has less or more precise functional requirements and a strictly defined LOT. Typically, in order to create appropriate model architecture, the person should take into account a huge number of correlations between the different requirements. The person needs to make many decisions as to how to segment the part of reality to be modeled and how to simplify the model. The probability of mistakes is very high.

It is an aspect of the present invention, that there should not be purpose to build the model at once and perfectly.

It should be noted that the primary modeling period can be shortened significantly, compared to prior art design period.

It is assumed that the model will be updated and improved iteratively: interchangeably with the coding stage and in the subsequent steps.

Typically, the common computer-based software projects assume that the design is to be finished before coding starts. Practically, in most cases, the assumption that the design can to be finished before coding starts is far from reality. Typically, the design activity continues, but only on the code itself.

Typically, the original design documents are not updated. As result, shortly the original design documents become irrelevant to the program code.

Figure 3:
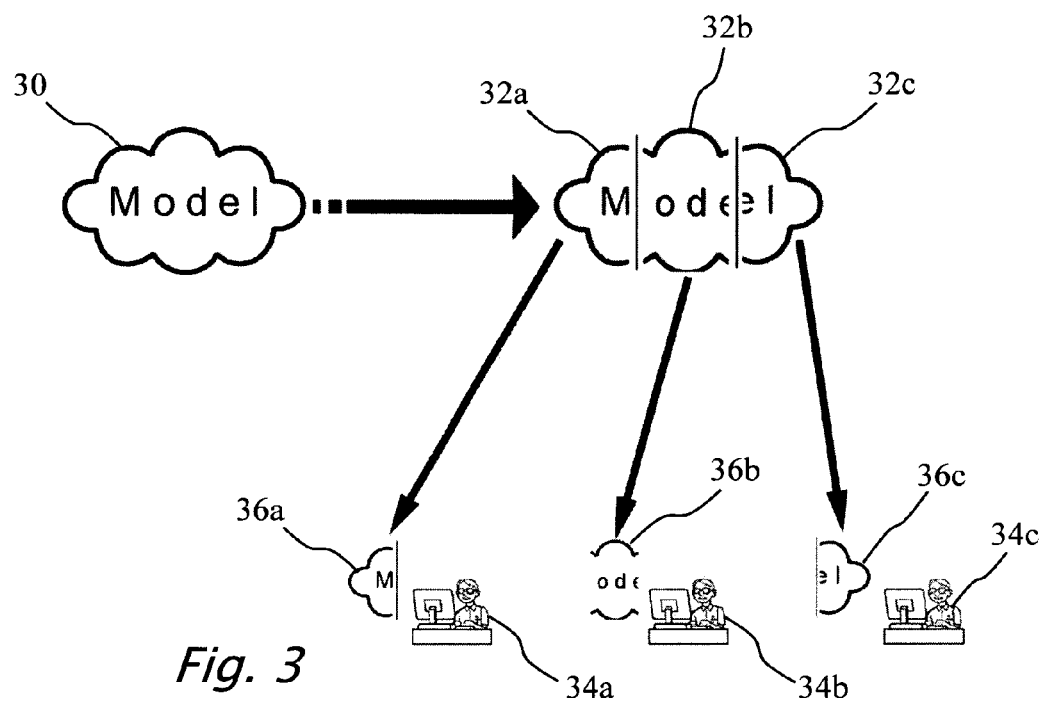
FIG. 3 (prior art) schematically illustrates traditional relations between design and coding activities within a software project.

As shown in FIG. 3, model 30, segmented into segmented model 32, wherein a memorized segments 36 of segmented model 32, resides in respective sub-cortexes of separate programmers 34. Each segment of model 30 evolves separately and the model 30 loses integrity.

Figure 7:
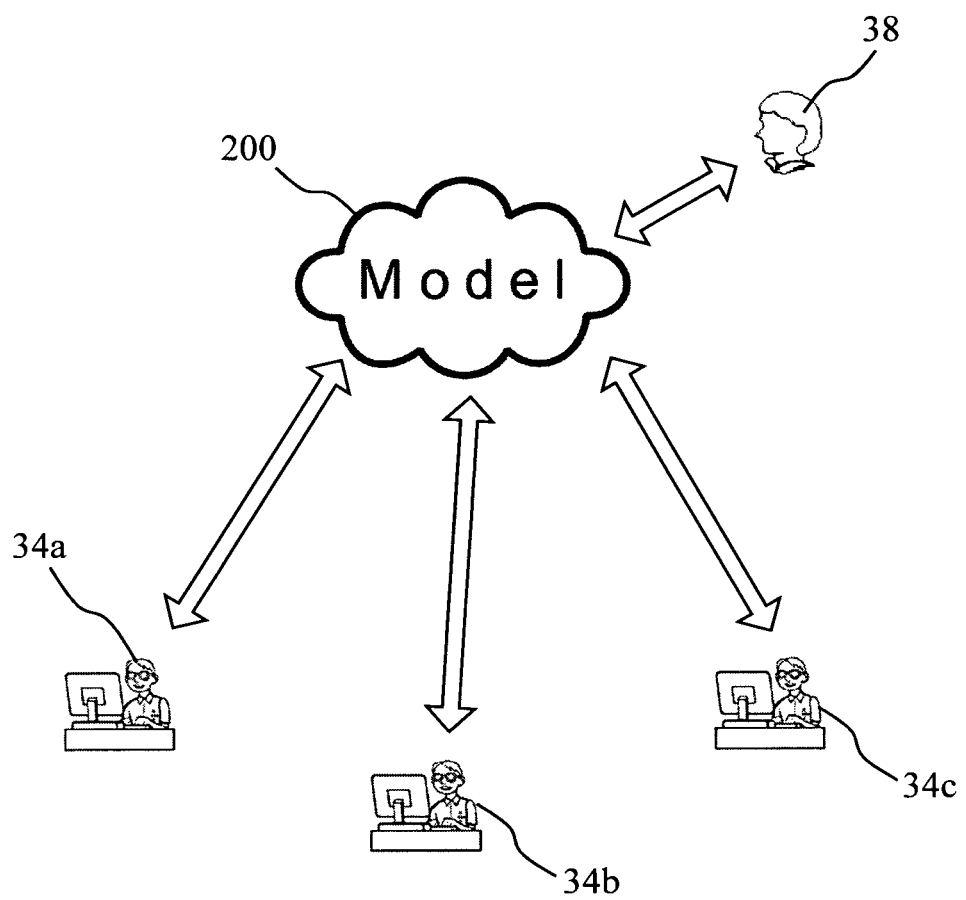
FIG. 7 illustrates relations between design and coding activities within a software project, according to embodiments of present invention.

In contrast to the current art problem, as depicted in FIG. 3, FIG. 7 illustrates that according to the present invention, a model 200 is evolved interactively by all the members of the team of programmers. Hence, model 200 shares the whole team knowledge base, including the separate programmers 34 writing the code and the manager 38 of team of programmers directing the computer-base software project. The interactive process of writing the code, represented by box 124 (see FIG. 6) and keeping shared model 200 up to date (represented by box 122 in FIG. 6) is represented by the bidirectional arrow between boxes 122 and 124.

The term "model" means "the product of a design stage" in commonly acknowledged terms. The model should reside in documents and self-explanatory code, but the most important issue is that the model should represent the shared knowledge-base of the computer-based software project.

Preferably, if a programmer 34, while writing the code, reveals some problems which problems probably influence model 200, the programmer should report to the leader of team of programmers 38.

Preferably, leader of team of programmers 38 is responsible for delivering acquired knowledge from a team member 34 to the shared knowledge base 200, to system architect and to other team members 34.

It should be noted that at the very early stages of the computer-base software project, modeling step 120 may slow and complicate the work, but slow advancement at early stage of development process is a natural situation when constructing a complicated system from scratch. Later some kernel of the system, which kernel properly reflects the reality, would crystallize. As the kernel grows, more and more changes could be done easily, just as the iterative development methodology declares, but does note deliver on the promise.

It should be noted that the system architect hardly ever creates an immediately correct model of reality, but the process of the present invention advances the software development team to the desired point. At later stages of the computer-based software lifecycle, the expansion of model 200 becomes substantially easier because the expansion of model 200 reflects expansion of the modeled part of reality.

Figure 1:
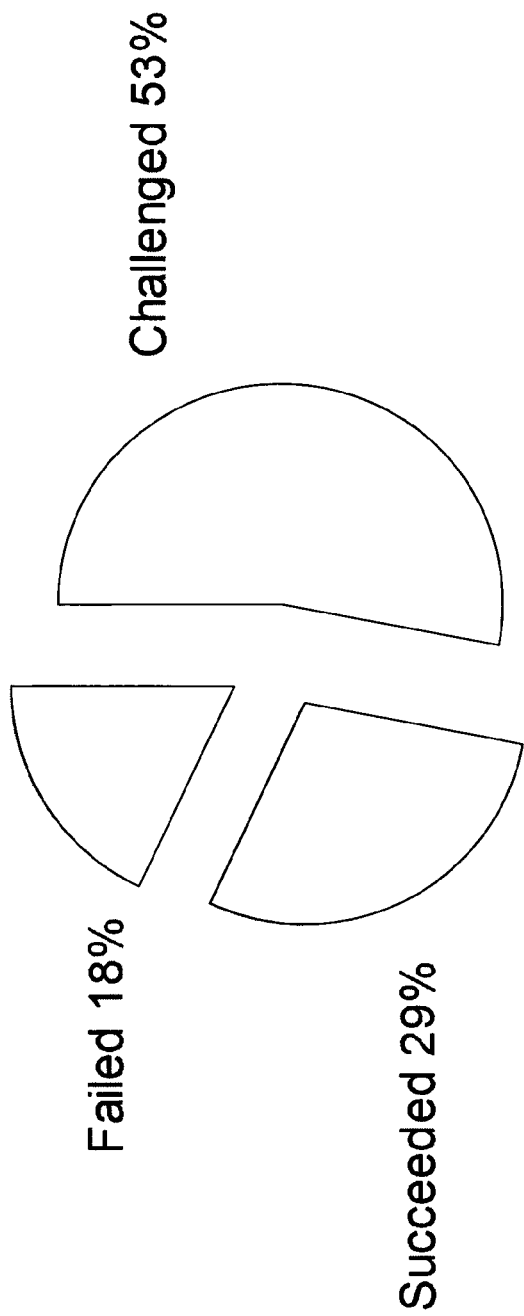
FIG. 1 (prior art) graphically illustrates a chart showing statistics about software projects successes and failures, as collected by the Standish Group.
Figure 2:
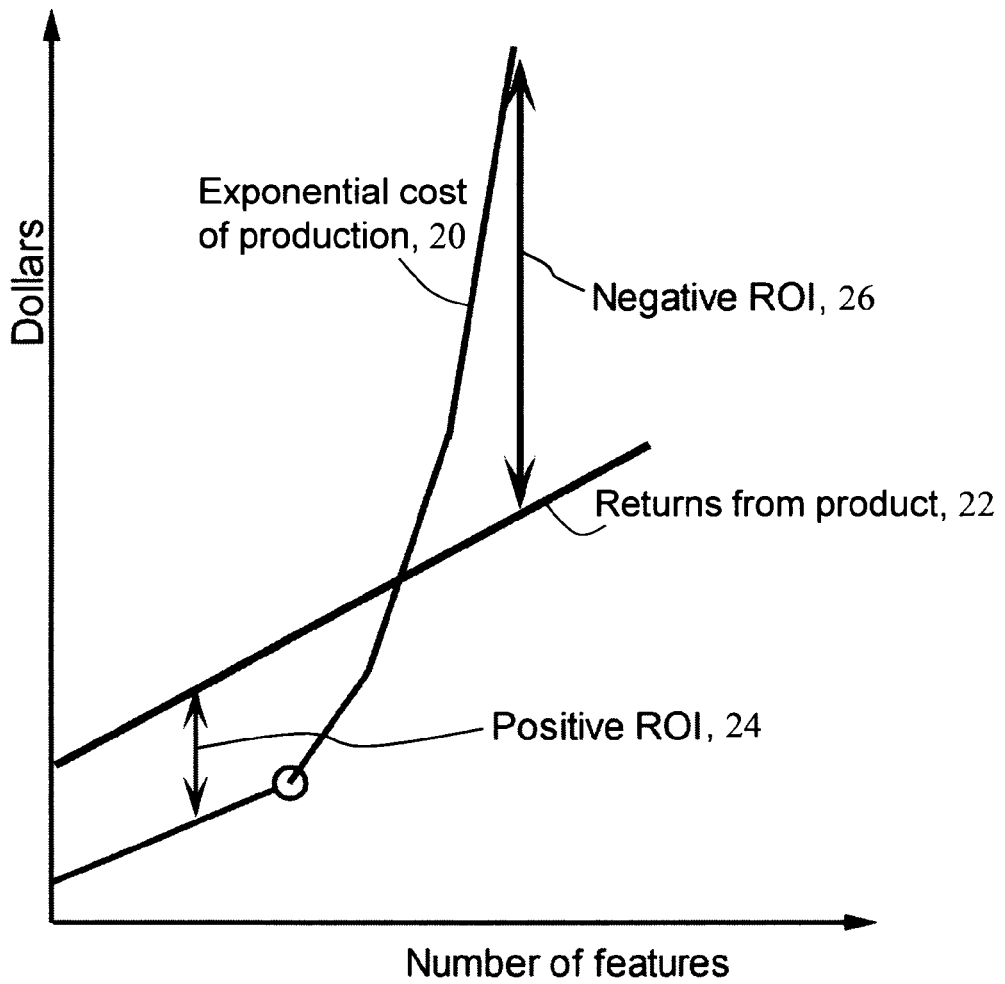
FIG. 2 (prior art) represents graphical illustration of results of the research carried out by the CIO Update Internet portal.

In contrast to the current art problem, as depicted in FIG. 2, the method of the present invention allows for achieving situation where the cost of the code changes descends in the time rather than grow exponentially, as is the case in current computer-base software projects.
OOD/OOP Preferably, model 200 is designed in object-oriented manner, that is model 200 is expressed as set of interacting objects and activity of the objects. Objects should be derived from the problem to be solved and the names of objects should be derived from the terms, appearing in the LOT. Then the objects appearing in the model should be implemented in the code as classes containing the member data, which member data represents the state of the objects. The classes implementing the objects appearing in the model should have member functions, which member functions represent activities of the objects.

Multithreaded Application Modeling

An additional important innovation of the present invention is that the design of multithreaded application should include proper threads planning at the modeling stage.

Each thread should be defined as an object-actor with a specific role in the application. Threads should be seen as persons, organizations or machines acting independently and concurrently, but each of the persons, organizations or machines operating sequentially.

System architecture creation should include definitions of inter-thread interaction, coordination and synchronization, similarly to planning of interaction and coordination between troops.

When planning interaction and coordination between threads it is required to take into account what ways of interaction (synchronization) are available.

An aspect of the present invention is to provide a tool for inter-thread communication, based on messaging.

Versions of Model

The model of a computer based software system should be developed version by version, from the very first version and including every version issued at the maintenance stage. No milestones are assumed.

The present invention assumes that cancellation of principle of minimal changes makes it possible to transform any given well-documented version of model and code into any other well-defined version including clean code, not containing traces of previous version.

Each version should have a clearly defined set of features. Each advance to the next version should be planned and the plan should be implemented. Any unexpected change in requirements should be reflected in the next plan.

Each version of the code should clearly correspond to a specific version of the model.

Step 124: Code-writing & Compiling on a Computer.

Coding activity is defined as code writing and compilation without running.

A programmer should start coding after the primary modeling period and repeat modeling and coding interchangeably. The detailed design is done in the code itself. Moving from modeling to the coding and back enables deeper understanding of the process implemented by the code. Repeating the modeling stage enables to make the model more realistic concurrently keeping integrity of the system.

Self-explanatory Code

An aspect of the present invention is to make the code self-explanatory. Thereby, the program code also serves as a kind of document, understandable without running. Hence, most errors in the code should be found visually, before the code is run.

For clarity purposes, a program code is compared with geographical maps. There are maps of any level of detailed elaboration: world, continent, country, city and so on. The code should be built according to the same principle: from a lower level of detailed elaboration towards the higher level of detailed elaboration.

Classes and functions serve modularization and simplification means. Modularization is a known solution for situations where the volume of information to be processed is too big to be kept in a human's mind at once.

All names of classes, functions and variables should be derived from the terms appearing in the LOT, which requirement means, that any segment of the code could be easily explained in the terms, appearing in the LOT.

There are no "good forever" names. Names are good or bad relatively to the version of model and LOT and should be changed as needed.

A programmer should be able to work out the code step by step, switching from one level of detailed elaboration to another level.

At each level of detailed elaboration, the volume of information to be concerned should be small enough to ensure proper information processing and control loss avoiding.

The model, described in documents, should not include all the details of the implementation in the code. The model might be compared to the "world geographical map". But it should be visually obvious that the code components represent "partial maps" elaborated in more details.

Once a person learns to read geographical maps, the person is able to read any map. The same should apply to self-explanatory code: if a person once learned a specific programming language and if the person is familiar with the model of software system implemented by the code, then the person should be able to understand the code written in the programming language.

Typically, in prior art programming, programmers do not read and do not understand the code the programmers are being debugging. Instead the programmers run the code and try to achieve the required functionality. Traditional technique causes the debugging stage to be theoretically endless.

To turn a code into a self-explanatory code, a programmer should use objects which objects represent terms appearing in the current version of the model and in the LOT. Preferably, each primitive variable (at least most of them) should be given for explanation in terms of the current version of LOT.

The code should not contain any traces of previous versions. Intentions for the future versions might be memorized in a separate document and not in the code.

Generally, the rule is as follows: if there is a code segment which code segment cannot be understood by anyone, that code segment should be turned into a comment and later the code segment should be removed or replaced.

If turning the code into a comment causes functionality loss, the code segment, which code segment was turned into a comment, should be replaced with an understandable code segment. It is unacceptable to keep in the code fragments which code fragments nobody is able to understand. Self-explanatory code could be easily passed to another programmer.

Logical Expressions

A program has a variance, which statement means that the sequence of fulfilled commands varies from one execution to another. Logical expressions in a program code represent switches between branches of the program execution.

A program could be seen as a tree of execution paths. The tree in turn consists of sub-trees and so on. Each logical expression should represent a fork dividing a tree into meaningful sub-trees. The term "meaningful" is relative to the version of the model. As a model evolves, logical expressions should be reformulated. If a logical expression cannot be clearly correlated with the model and explained using the terms appearing in the LOT, the logical expression is likely to distort the reflection of the model onto the code. On the contrary, keeping logical expression to be "meaningful" from the view point of the model allows for a very different and successful debugging technique.

It is assumed, that the model and the code are simplified abstractions of reality. Each irrelevant to the model logical expression moves the code away from reality, and it becomes increasingly difficult to implement required functionality using code irrelevant to the model and/or model irrelevant to reality.

Multithreaded Coding

As it was already mentioned earlier in present document, for now, there is no feasible methodology of writing thread-safe code. The present invention solves the problem by providing a methodology for writing safe multithreading code.

The solution is based on the once-debugged code provided by the middleware library. The code encapsulates all locking operations and allows for user not to deal with locking operations at all.

When speaking about threads, there cannot be an automatic memory guard. The nature of threads, on the contrary to processes, allow for threads to use the same memory with no automatic guard. The feature of memory sharing with no automatic guard provides threads with much better performance but produces the problem of thread safety.

Additional requirement of the methodology of the present invention towards the user is to abide by the memory isolation rule. The memory isolation rule states that it is required to eliminate any memory sharing except for memory sharing supported by middleware library provided by present invention.

The present invention provides logical rules and clues which rules help to isolate the majority of the memory, allocated for a process. "Isolate" means to logically divide the majority of the memory, allocated for a process between threads.

A procedure of checking the code for abiding by the memory isolation rule represents a task of linearly growing complexity, because each function in the code might be checked separately—with no correlation with other functions.

The requirement towards the user of the multithreading module to restrict the ways of memory sharing with the ways supported by the multithreading module, requires in turn from the multithreading module, to provide a user of the multithreading module with sufficient flexibility.

FIGS. 13-17 of accompanying drawings provide examples of multithreading scenarios given for very easy implementation using provided multithreading module.

It should be noted that the described example scenarios are far beyond of current capabilities of most programmers.

FIG. 28 code snippet implements one of actors of complicated example scenario (1500) shown in the FIG. 15, described hereinbelow) and illustrates the easiness of implementation.

Technique of Multithreaded Coding

Provided the modeling has been done as described here above in section "Multithreaded application modeling" of step 120, each actor appearing in the designed model should appear in the code as a thread master, which thread master should represent the state and the behavior of the actor.

Thread master should be logically attached to a thread of execution in order to involve the thread of execution into inter-thread communication (messaging), supported by middleware library of present invention.

It should be noted that the thread master gains ownership over part of memory allocated for application, in order to implement the role of corresponding actor appearing in the model of the application. Technically speaking, ownership over a memory item should be reflected in the code the following way: the thread master attached to a specific thread of execution should store references to all memory items belonging to that thread of execution.

References to memory items, belonging to other threads of execution should not be stored directly. Instead, the references to thread masters, allocated for corresponding threads, can be stored.

The "alien" for current thread of execution thread masters are not allowed to be de-referenced in order to call the member functions of the thread master directly or use the member data of the thread master directly. The "alien" thread masters should rather be used as addressees for messages sending.

Regarding each function which is not member function of a thread master, programmer should check, what thread(s) of execution the function can be performed on, as follows:
  a) If it is possible to follow workflow of a thread, and by doing so to reveal which thread specific function can be performed on, the tracing should be performed. For example, if a function, calling the function in question, is actually Execute( ) function of a thread master which Execute( ) function represents the root function of the thread of execution or the calling function is directly called from the Execute( ) function of a thread master—the case is the simplest case. The called function in question is always performed on the same thread of execution as the calling function.
  b) If it is difficult to follow workflow of a thread, it should be supposed that the function in question will be performed within workflow of different threads. Typically, if a function represents a member function of a low-level auxiliary class, the function typically can be performed within workflow of different threads.

If a function can be performed within workflow of different threads, the thread master attached to the current thread of execution should be retrieved within the function in question. Then, the function is capable of knowing what data the function "owns" (according to the memory isolation rule) being performed on specific thread of execution.

Then the function can properly process relevant data depending on the current thread of execution. No function is allowed to directly use "alien" for current thread of execution memory items—direct usage would represent violation of memory isolation rule.

Exceptions of the memory isolation rule are generally allowed, but then traditional technique of locking should be applied for a relatively small amount of memory items. Even admitting exceptions, the introduced technique drastically reduces the total volume of work.

Coding of Data Changes in a Multithreaded Code

The following technique is recommended for safe changing of thread-shared data:
  a) Each memory item is allowed to be changed only within the workflow of the thread of execution, which thread of execution represents the owner of the memory item.
  b) If non-owner thread reveals that a memory item should be changed, a message should be sent to the thread-owner of that memory item.

Coding of Data Usage (Reading) in a Multithreaded Code

Retrieval of data belonging to a non-owner thread of execution, may take place in the following scenarios:
  a) Read-only (immutable) data can be used with no restrictions.
  b) The thread-owner sends messages to all interested threads each time the data item is changed and each interested thread just keeps a copy of the data item.
  c) Each interested thread sends a message-request to the owner of the data item of interest and waits for response.
  d) Direct usage with locking is allowed as exception of the rule.

Messaging in a Multithreaded Code

Each message object should be allocated for a single-time usage. After a memory item was allocated for instantiation of the message and the message was sent, the sending thread of execution is not allowed to use the memory item anymore.

A message can be an object of any class derived from a GMessage class provided by the multithreading module. Thus, a message is capable of passing any information from one thread to another without marshalling, formatting or so. The messaging algorithm implemented in the multithreading module fully exploits advantages of the fast inter-thread communication.

Concurrently multithreading module implements 100% thread-safe, highly flexible and properly debugged messaging algorithm. The user of the multithreading module does not have to deal with critical sections—the user rather uses atomic calls to the messaging functions Send( ) and Receive( ), implemented by the GThreadMaster class.

Furthermore the described technique makes writing of correct multithreaded code feasible. Bugs, related to multithreading, could and should be found within dry-run stage, without a debugger, because the debugger is useless when speaking about errors related to the memory sharing in the multithreaded code.

More detailed description of the multithreading module is provided within the chapter describing the middleware library, as described herein below.

Versions of Code

It is very important that each version of software system contains a clean code, without any traces of previous versions or unimplemented intentions for the future version.

Figure 5:
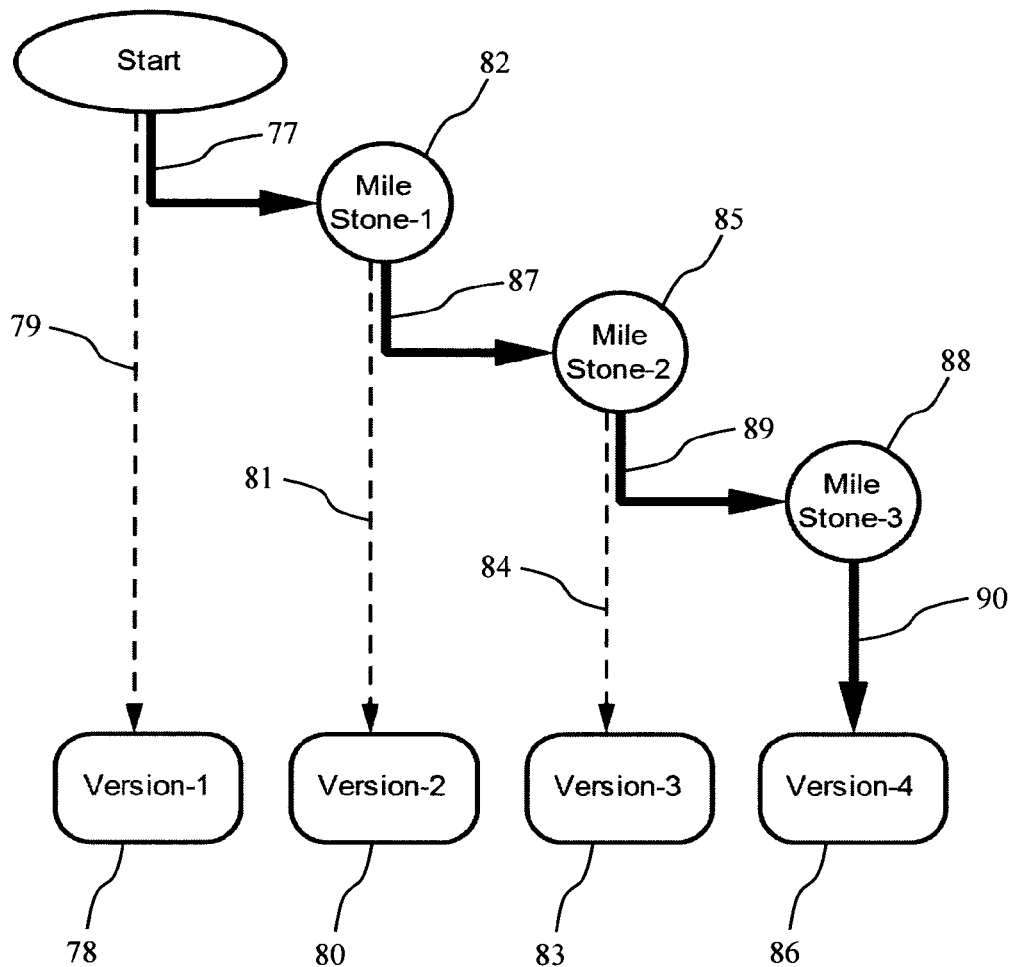
FIG. 5 (prior art) illustrates versions management implemented by the Agile methodology.

Reference is now made to FIG. 5, which drawing illustrates an example of prior art iterative development in practice: versions 1, 2 and 3 78, 80 and 83 respectively, were planned but never actually implemented because when arriving to respective milestones 82, 85 and 88 respectively, decision was made to change direction and instead of respective routes 79, 81 and 84 go along with routes 77 and 87, 89 correspondingly. The code of implemented version-4 86 keeps traces of the described zigzag process. Errors done before arriving to a milestone are never fixed—the errors are just patched because of the principle of minimal changes. The only achieved goal—some errors, which errors might bring the project to disaster, can be prevented by changing direction at milestone.

The present invention introduces the following version management: project should move from version to version in planned and controlled manner and disaster will be averted. Each code version corresponds to a specific model version. If revealing that the model is internally inconsistent and thus cannot be implemented as is, the model should be fixed and the code should be changed accordingly.

Figure 8:
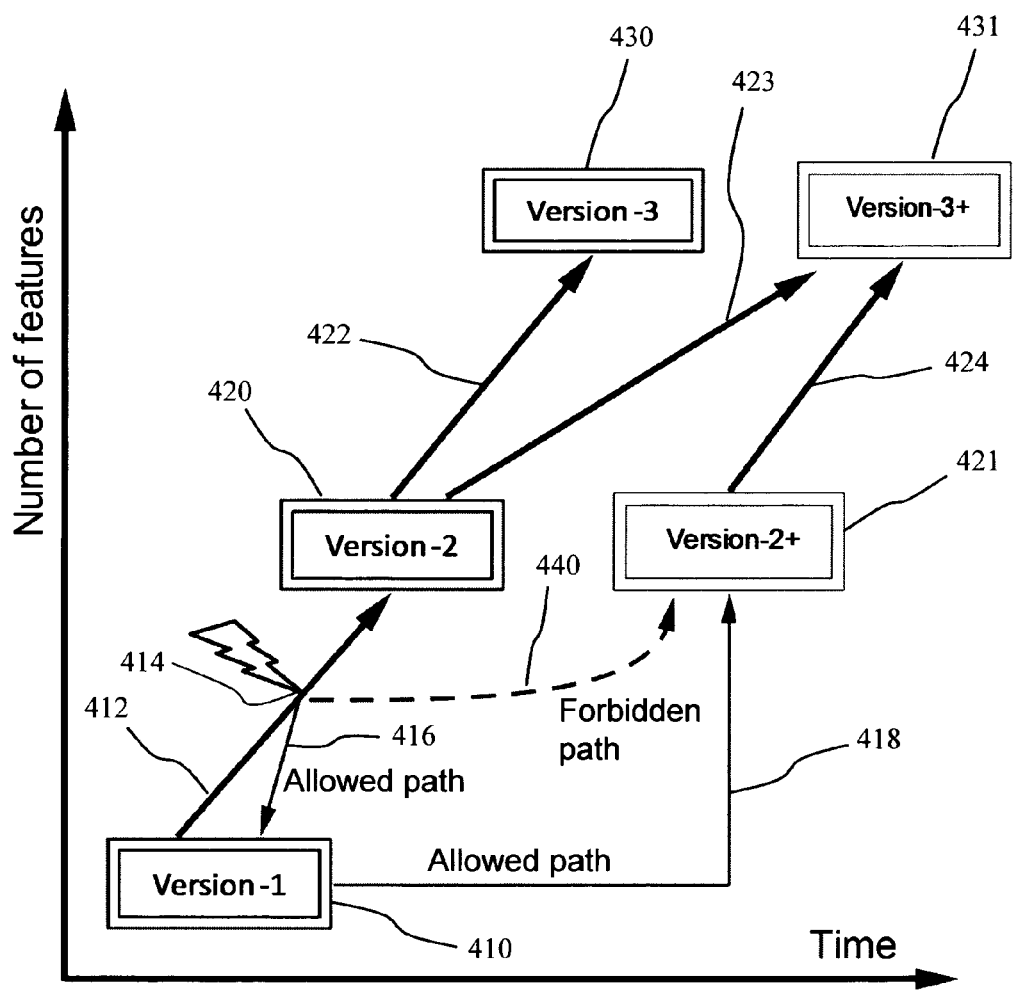
FIG. 8 graphically illustrates versions management within a software project, according to embodiments of the present invention.

If revealing that the model does not implement one or more required features or requirements change unexpectedly, the project manager should make decision. FIG. 8 graphically illustrates an example situation, where changes have to be made to a software project model. In the example in FIG. 8, the project has completed version-1 410 and a path 412 to version-2 420 is planned. If no unexpected change happens, path 422 to version-3 430 is planned and implemented after version-2 420 closes.

Point in time 414 is the moment when an unexpected change occurs.

There are 2 possible decisions:

Either the software project returns back to version-1 410 (path 416), the model is changed in order to implement the required new features and then project moves to version-2+ 421 (path 418); after version-2+ 421 closes, path 424 to version-3+ 431 is planned and implemented.

Or the software project goes on toward version-2 420 as if nothing happened. When arriving to version-2 420 the model should be changed in order to implement the required new features and then project moves towards version-3+ 431 (path 423).

No matter what decision was made—unexpected changes are finally implemented in the version 3+ 431.

It should be noted that moving along the path represented by dashed curved arrow 440 is forbidden.

Step 125: If Modeling Error(s) are Revealed Within the Code-writing Stage (Step 124), the Programmer Should Return to Step 120.

Step 130: Model-driven Dry-run Test.

Model-driven dry-run is a very important part of the present invention.

In the dry-run, the programmer repeatedly compares the program code to the model in the mind and by doing so, verifies the correspondence of the program code to the model in early stages of development.

The introduced model-driven dry-run differs from the traditional dry run in that that the traditional dry-run checks the program code or model for providing the required functionality.

Step 135: If Dry-run Reveals Some Modeling Errors Go Back to Step 120.

Step 140: Model-driven Modular Debugging.

Presently, the debugging stage is the most time consuming stage and it is very difficult to estimate the duration of the debugging stage. Typically, programmers do not think about Object-Oriented principles, but rather hurry to get the code to work.

According to the present invention, the debugging becomes much simpler and more mechanistic activity.

The prior art debugging technique is as follows: the programmer follows some path of execution from the start and up to exit through a number of forks of execution and checks the final result in front of the functional requirements.

As the path is debugged, another path is tested. There is no way to ensure that by fixing one path of execution, the programmer does not damage another path of execution. Theoretically the fixing-damaging-fixing activity can be endless.

The present invention introduces a different debugging technique.

Figure 9:
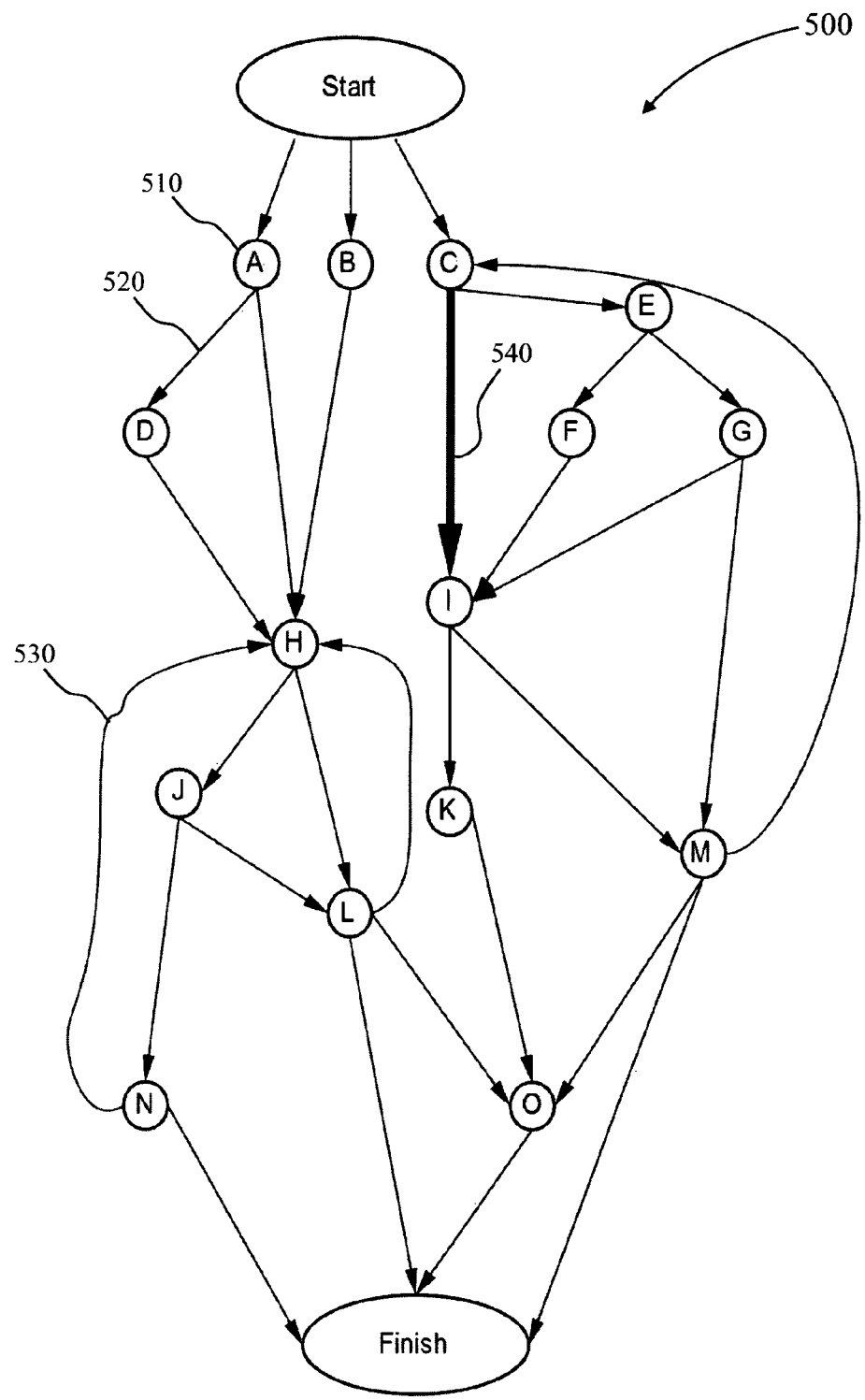
FIG. 9 is a graphical illustration, exemplifying a model-oriented debugging of a primitive program, according to embodiments of the present invention.

Reference is now made to FIG. 9, which drawing depicts an example of workflow of a primitive program 500. A, B, C, . . . , O represent abstract nodes which nodes logically break the program code into a number of meaningful segments, for example, segment CI 540. Some nodes, for example, A and C, represent forks of execution being containing logical expressions.

The present invention introduces debugging techniques to be applied when a code segments between two nodes and forks of execution become minimal units of debugging.

According to the present invention all intermediate results should be predictable from the viewpoint of the model. A programmer should compare intermediate results of program execution to the control values computed based on the model. Then, automatically, also all final results would be correct.

The programmer should not follow the path of execution up to the exit. The programmer rather should fully test each minimal unit of debugging.

Each short segment should be fully tested with different inputs. Each fork of execution (logical expression) should be fully tested with different inputs. The programmer should ensure that the workflow passes through specific fork of execution correctly (from the view point of the model!) and is directed to the proper sub-tree.

After the fork is properly debugged, the programmer moves to the next level of abstraction and checks each sub-tree separately. Short segment—oriented debugging technique is modular technique, which technique does not require keeping in the human's mind full information about all the paths of execution.

The working code is the code implementing the model. Otherwise there is a good chance that the code only seems to be working.

At school, in the lessons of mathematics, it was not sufficient to compute correct final result, teacher required to explain how the result has been computed. The present invention introduces a similar approach. A programmer should explain why the programmer thinks that the constructed code is correct from the viewpoint of the model. Running some working tests is not sufficient. There are many cases when test results are falsified and bugs are hidden.

It should be noted that a programmer is not required to prove that the constructed code implements the required functionality.

The leader of team of programmers should understand all the code and the explanations of team members. Then the leader of team of programmers can take responsibility to the boss of the leader of team of programmers and so on.

Finally the company should be able to take responsibility towards the customer/investor.

Memory Management in Languages Such as C++

Memory allocation and memory freeing treatment in languages such as C++ represents highly time-wasting activity within debugging stage.

Tools automating the memory management activity exist. Example module solving the problem is supplied for free along with middleware libraries provided as part of present invention.

Important aspect of present invention is that automation of the memory management represents mandatory condition for affordable debugging time achieving.

Step 145: If Some Modeling Errors are Revealed at the Debugging Stage, Go Back to Step 120.

At debugging stage there still is probability that the team of programmers would have to return to the modeling stage in order not to lose the consistency between the program code and the model.

Debugging cannot compensate for modeling errors. If it becomes clear that the revealed errors are not minor errors, if the model to be implemented changes significantly in the vision of the system architect or if already implemented code loses self-explaining ability in the terms of the model, the team of programmers should return to the modeling stage (step 120) and then change the code accordingly.

Step 150: Integration.

Presently, the integration of a software system is the most painful procedure. The reason for the painful situation is that usually while the part of the code assigned to a programmer is being debugged by the programmer, the code loses relevance to the model, which model was created at the design stage. Thereby, the software system loses integrity and the parts of software system lose the ability to inter-communicate.

Presently, the leader of team of programmers is unable to know in details what functionality each program component is going to provide—before the component starts to work. Often, when arriving to the integration stage, the members of the team of programmers realize that components developed in parallel are not able to inter-communicate. Then, the members of the team of programmers have no choice but re-model the system. But typically, unexpected modeling activity is very poor organized as it is assumed that the modeling should be done only once at the very first stage of the software project.

According to the present invention, the leader of team of programmers is responsible for keeping the integrity of the software system, including the ability of components to inter-communicate. Thereby, integration is simply debugging of integrated system. Integration should not include chaotic re-modeling, as it is often the case in prior art software project.

Step 155: If Some Modeling Errors Revealed at the Integration Stage, Go Back to Step 120.

Integration could be seen as sub-stage of debugging stage. This is why integration cannot compensate for modeling errors. All written about step 150 is relevant to the current step.

Step 160: Delivery.

When done, the software system, having a debugged code and a clear model with substantially full integrity, is delivered to the client.

Step 170: Maintenance.

Presently, maintenance is known as very frustrating occupation. Programmers do not want to deal with maintenance at all. Costs of maintenance grow exponentially with the lapse of time and sooner or later the software maintenance becomes unaffordable because the code actually turns into an aged black box. Nobody is able to understand the code representing the aged black box and change (fix) the code in controlled manner. As the maintenance becomes unaffordable, the code dies and is cast away.

According to the present invention, the maintenance is regarded as a continuation of the software development. Exactly the same methodology should be used for the maintenance. Within development process, the software system moves through number of versions. At the maintenance stage the process of moving from a version to the next version just continues.

The present invention eliminates knowledge loss both at the development and at the maintenance stages.

It should be noted that self-explanatory program code could be easily passed to another programmer.

Documentation

Documentation should be seen as form of verbal explanation and can be used for model improvement and verification.

The Middleware Library

According to the present invention a middleware library is mandatory for achieving affordable debugging time regardless of periodical code rewriting.

The library contains tools which tools are typically invented for some special aspects of coding, which aspects of coding still have no object-oriented solution. Typically, the library tools are debugged algorithms which algorithms accelerate the debugging stage, but the tools influence modeling activity as well. The library tools represent powerful simplification means.

An aspect of the present invention is to provide two mandatory modules: multithreading module and text parsing module. Multithreading module and text parsing module represent a minimal mandatory set which minimal mandatory set turns the process introduced by the present invention into affordable and useful process.

The Text Parsing module

The text parsing module provides the programmer with the ability to use object-oriented tools for text parsing, instead of primitive tools provided by C++ and C# languages. The text parsing module, introduced by the present invention, encapsulates the most inconvenient and error-prone procedures which procedures require much code to be implemented, obscure the logic of the program and prevent the code from being self-explanatory.

Text parsing algorithms of the present invention are important part of the present invention because the parsing algorithms enable to plan strong, flexible and cheap testing and simulation sub-system, debug inter-communicating components in parallel and arrive to the integration stage with well-debugged components keeping the ability to inter-communicate.

The text parsing module implemented in the middleware library includes a parser used for parsing of a very simple script language named, by way of example, PARAS. An important aspect of the invention is that there should be a parser for a script language which script language allows for simulating input data of any type and any complexity.

It should be noted that all names of languages, functions, classes, parameters, etc, described herein, are given by way of example only and any other name can be used.

Set of scripts written in the input simulating language (PARAS) enables to easily simulate the behavior of other components and by doing so, to debug each component separately.

Besides of the usage at integration stage, one of the most important areas where text parsing algorithms are required is the input verification, which input verification is crucial when speaking about secure code writing.

In addition, the text parsing module includes a class GStrTokenizer, which class allows for easy implementation of a wide range of different parsers (including a parser for PARAS). The interface of GStrTokenizer class is highly intuitive.

Furthermore, the text parsing module, implemented in the middleware library, includes a GStrTokenizer class invented for extracting specified tokens from a given input string, wherein the term "token" refers herein to a target substring which GStrTokenizer extracts from the obtained input string. It should be noted that the name GStrTokenizer is given by way of example only, and any other name can be used.

The strength and flexibility of GStrTokenizer class are based on 4 internally managed complex pointers. Each complex pointer encapsulates position in the string and the length of substring. The pointers are named, by way of example: Cursor, Separator, Prefix and Suffix.

Cursor points to the first symbol of a substring in which substring the token should be searched for. Separator points to the symbol after the token or after the markup substring after the token (if applicable). The length encapsulated by Separator might be 0 or 1. The length value allows for distinguishing between cases when there is real separator symbol after the token and where there is no real separator symbol. Existing or absence of separator symbol between two subsequent tokens influences the next token localization. Prefix and Suffix allow for recognizing additional optional markup substrings before and after the token correspondingly. The length of Prefix and Suffix might be more than 1. Substrings designated by Prefix and Suffix might be optionally included into returned token.

Despite of the fact that GStrTokenizer class has a lot of member functions, the intuitiveness of described internal structure allows for easy manipulating a wide range of ways, concurrently keeping self-explanatory ability of program code.

Figure 10:
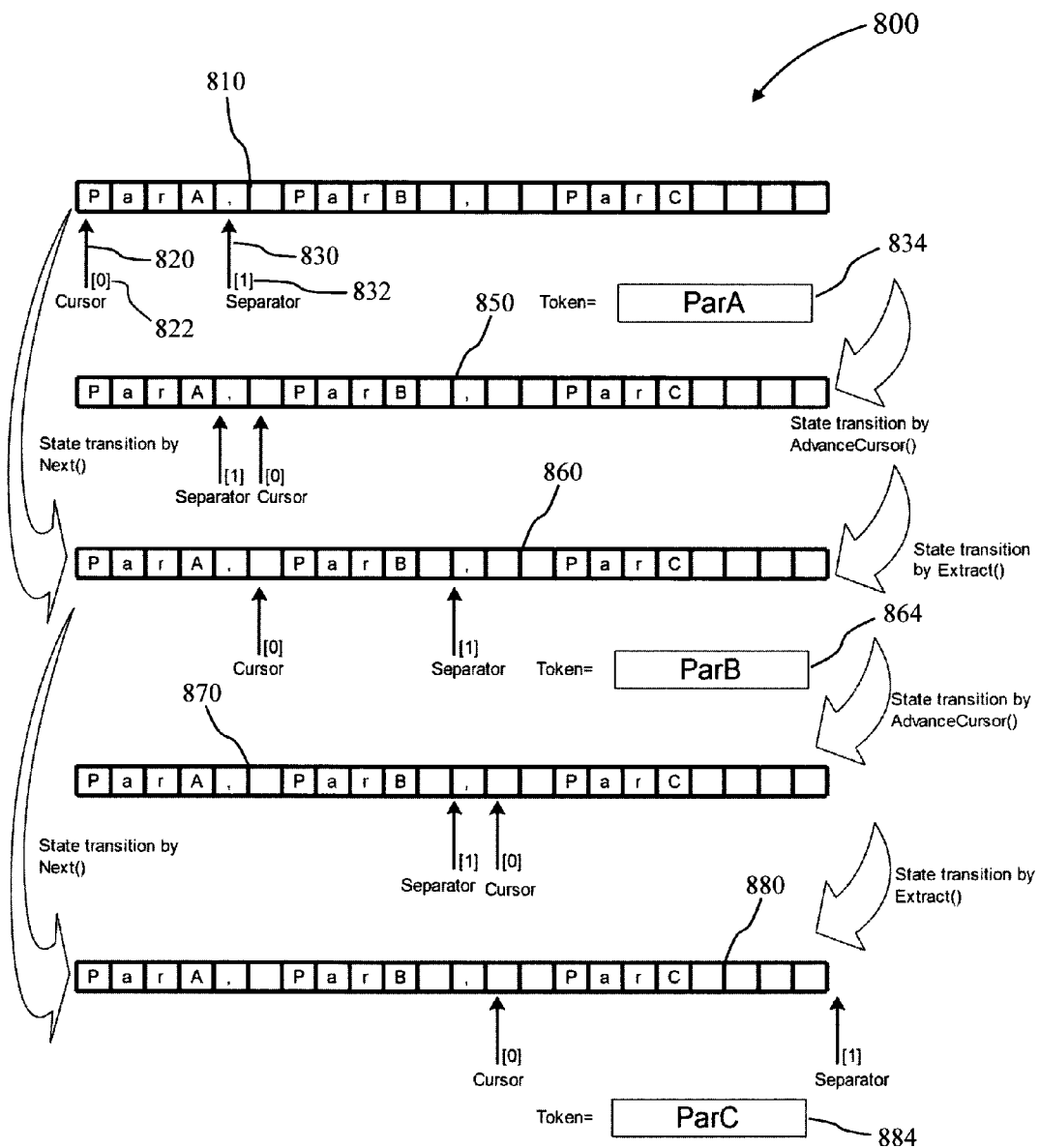

FIG. 10 exemplifies a use case 800 of the GStrTokenizer class. When creating an object of GStrTokenizer class (further the object of GStrTokenizer class will be mentioned as tokenizes) and immediately providing input string and specifying a separator symbol to be searched for, the object immediately enters internal state when Cursor is positioned to the first symbol of the input string and the Separator—to the specified separator symbol. In the described example a comma serves as separator symbol.

Subsequent call to the Token property returns the first token, in the described example—ParA (834). Line 810 depicts the state of the tokenizer immediately after construction. 820 is position of Cursor and value 822 is the length of Cursor. Location 830 is position of Separator and 832 is the length of Separator.

If the next function called after constructor is AdvanceCursor( ) function—tokenizer moves to a state 850: Cursor is positioned immediately after the substring specified by Separator. After AdvanceCursor( ) function call, Extract( ) function moves the tokenizer to the state 860. After AdvanceCursor( ) function call, Extract( ) function call is capable of changing separator symbol to be searched. Both AdvanceCursor( ) and Extract( ) functions calls can be replaced with a single Next( ) function call, providing the same result. The second token returned is ParB (864)

The Extract( ) function does not advance the Cursor. The Extract( ) function may be called repeatedly with different separator symbols, which symbols would be searched from the same position of Cursor and the returned token is expected to be different.

The third token may be extracted similarly, by moving the tokenizer object to the states 870 and 880. At the end of the input string, a separator symbol is not required as the end of the string is equivalent to any separator symbol. The third token returned is ParC (884)

Figure 14:
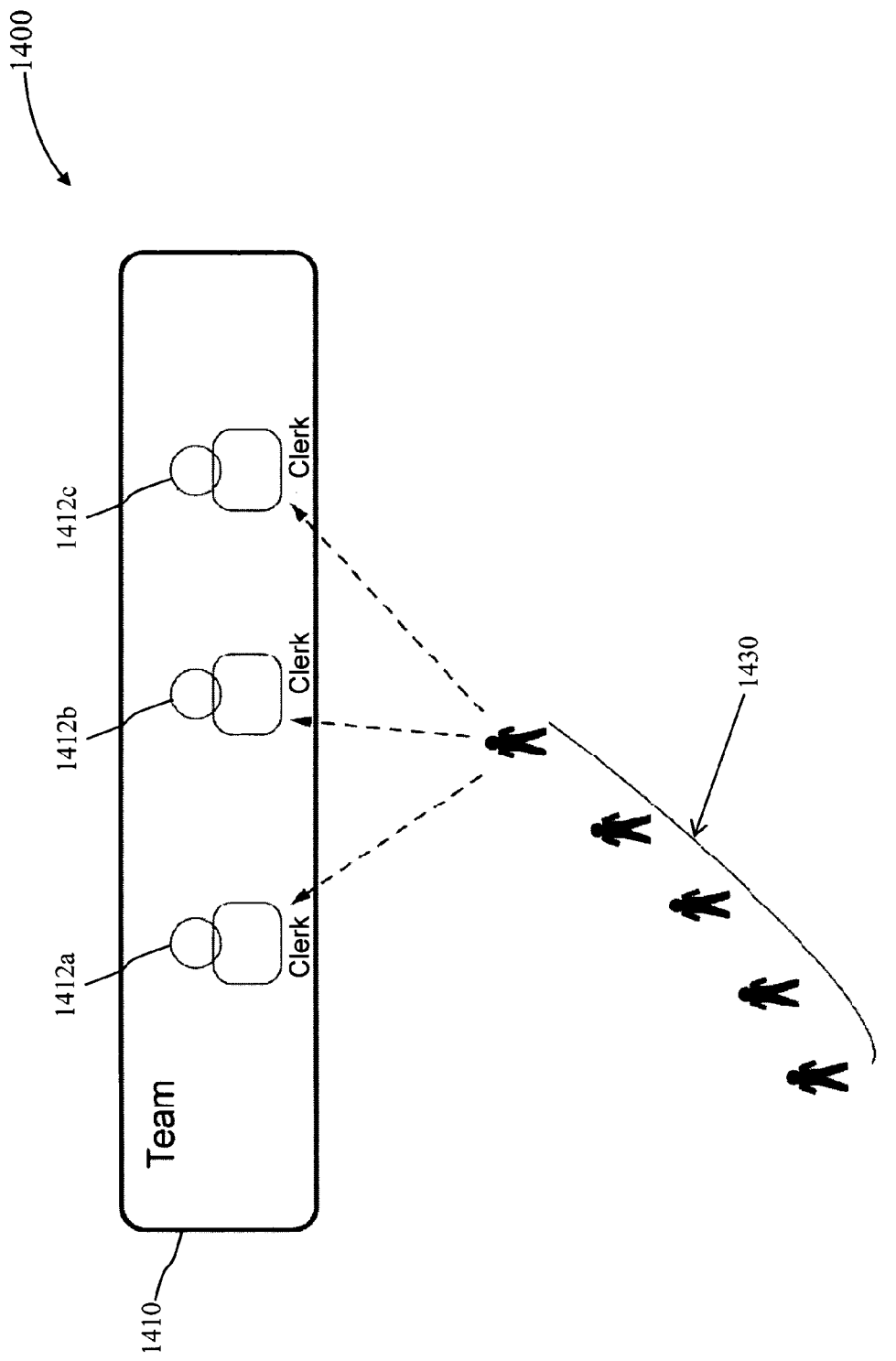

Another complex use case 900 is described in FIG. 14. Prefix and Suffix pointers are introduced. Code snippet 960 ignores the text before a specified prefix "/*", then searches for a specified suffix "*/" and extracts commented token: Comment (970).

Code snippet 980 extracts next commented token: Adjust (990).

The Multithreading Module

An aspect of the present invention is to provide multithreading design and debugging tools. Presently, the design of a multithreaded system cannot be done in an object-oriented manner, even when using the C# language, which language is called fully object-oriented programming language.

Figure 4:
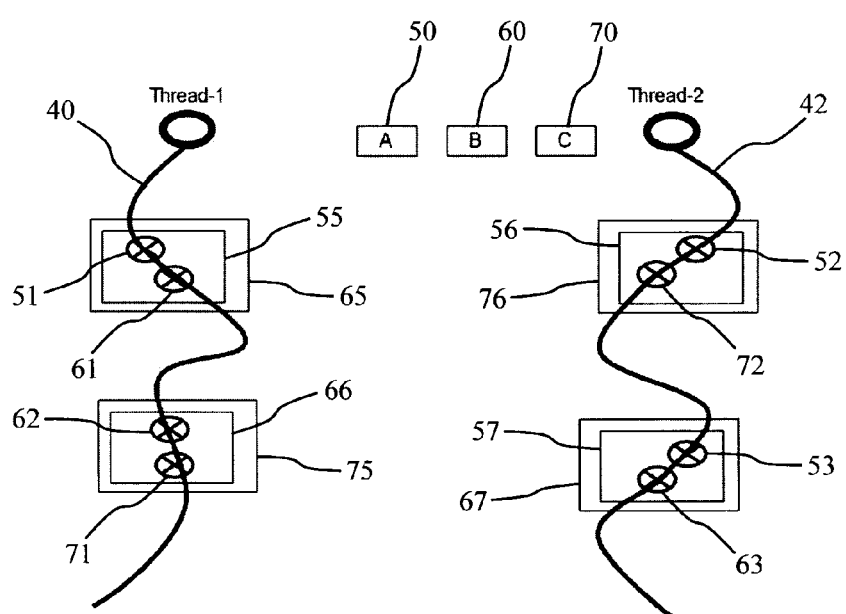
FIG. 4 (prior art) schematically illustrates traditional design of multithreaded applications.

Referring back to FIG. 4, which drawing illustrates a traditional multithreaded application design, it can be seen that the design is not an object-oriented design because the design does not deal with objects.

It is not possible to represent threads of execution as objects in the code using available means provided by C++ and C# programming languages. Though C# provides a Thread class, the Thread class is "sealed", which term means that the Thread class cannot be inherited and thereby cannot represent specific thread roles.

The multithreading module enables to design multithreaded code according to the Object-Oriented concept. Furthermore, the approach, introduced by present invention, allows for dry-run verification performing. The multithreading module encapsulates all the code implementing locks required when the code uses the memory shared between multiple threads of execution. The code is already debugged and tested, so there is no need to use a debugger in order to find errors related to improper locking of the code, which code uses the memory shared between multiple threads of execution. The errors can be only of a design type and thereby should be found within a dry-run.

Multithreaded applications should be designed in terms of actors and activity (behavior) of the actors. The modeling stage should include multithreading design.

Inter-thread communication should be designed in the terms of messaging between actors.

When coding the multithreaded applications the actors should be implemented as thread masters.

Microsoft is going to introduce new tools for parallel programming which tools allow for efficient exploiting of multi-core computers. The present invention does not contradict with the advantages introduced by Microsoft, but in addition present invention allows for efficient design and debugging of complex multithreading applications.

The major classes exposed to the user of multithreading module are GThreadMaster, GThreadingTeam, GThreadingManager and GMessage classes.

User can derive classes from GThreadMaster, GThreadingTeam, GThreadingManager and GMessage classes. The derivation is required in order to override virtual member functions or store user-defined data inside of the objects.

In the case when user desires to create new thread of execution, the user should derive a class from GThreadMaster class and override Execute( ) virtual function of GThreadMaster class. The overridden Execute( ) function of the class, derived from GThreadMaster class, becomes root function of newly created thread of execution.

New thread of execution can be run using the SpawnThread( ) function of threading manager or threading team. If a new thread of execution is run the way supported by the multithreading module, thread master should be instantiated before the new thread of execution is run and the thread master should be passed to the SpawnThread( ) function as argument There is an option to attach a thread master to an existing thread of execution created in any way, not supported by the middleware library of present invention. The attachment could be done using the AttachToCurrentThread( ) function of threading manager or threading team. If a thread master is attached to the existing thread of execution, the Execute( ) function of the thread master does not matter. Attaching thread master to an existing thread of execution allows for involving the thread of execution into messaging scenarios supported by multithreading module.

The introduced multithreading messaging algorithm is derived from real situations. This is why the multithreading module is applicable for a wide range of scenarios based on real situations.

Additional aspect required in order to make the algorithm, provided by the multithreading module, widely usable is aspect of flexibility. The Send( ) and Receive( ) functions, being atomic operations, concurrently represent some sort of a framework allowing for a user-defined code intrusion. The internal messages delivery mechanism is very flexible and implements a set of optional features which features can be customized by using user-defined functions.

The following optional delivery features are implemented within the Send( ) and Receive( ) functions and within thread master itself:

a) Redirection feature is implemented within the Send( ) function when peer-to-team message sending is used. Redirection means that a sending thread specifies team-of-threads as the target (addressee) of the message sending, but one of the members of the team-of-threads may redirect the message directly to the private queue of that team member, so that other team-of-threads members have no ability to receive the message. Optionally, within the Send( ) function, the algorithm loops though the team-of-threads members list and inquires each respective thread master whether the member is interested to "privatize" the message. If no member of team-of-threads redirects the message to the private queue of the member of team-of-threads, then the message is queued into the message queue of the team-of-threads and later any member of the team-of-threads can retrieve and process the message.

b) Optionally, a customization of reception order is implemented within the Receive( ) function.

c) Private message queue of a thread master might be optionally declared as sorted. Sorted queue feature is implemented as part of the state (member data) of the thread master.

d) Optionally, a transfer feature is implemented within the Receive( ) function. Transfer means that after a message is selected for retrieval from the message queue of the team-of-threads, there is an option to immediately move several additional messages (somehow logically related to the selected message) from the queue of the team-of-threads to the private queue of the receiving thread, so that other team members will not be able to retrieve transferred messages later.

e) Optional preprocess feature is implemented within the Receive( ) function. Preprocess represents additional looping over the message queue before any message can be selected for retrieval. Preprocess might provide additional criteria for the message retrieval decision based on some integral data which integral data can be computed on the base of queue content as whole.

f) Selective messages reception from private queue of a thread and/or from the common message queue of the team-of-thread (when applicable) can be specified.

Figure 12:
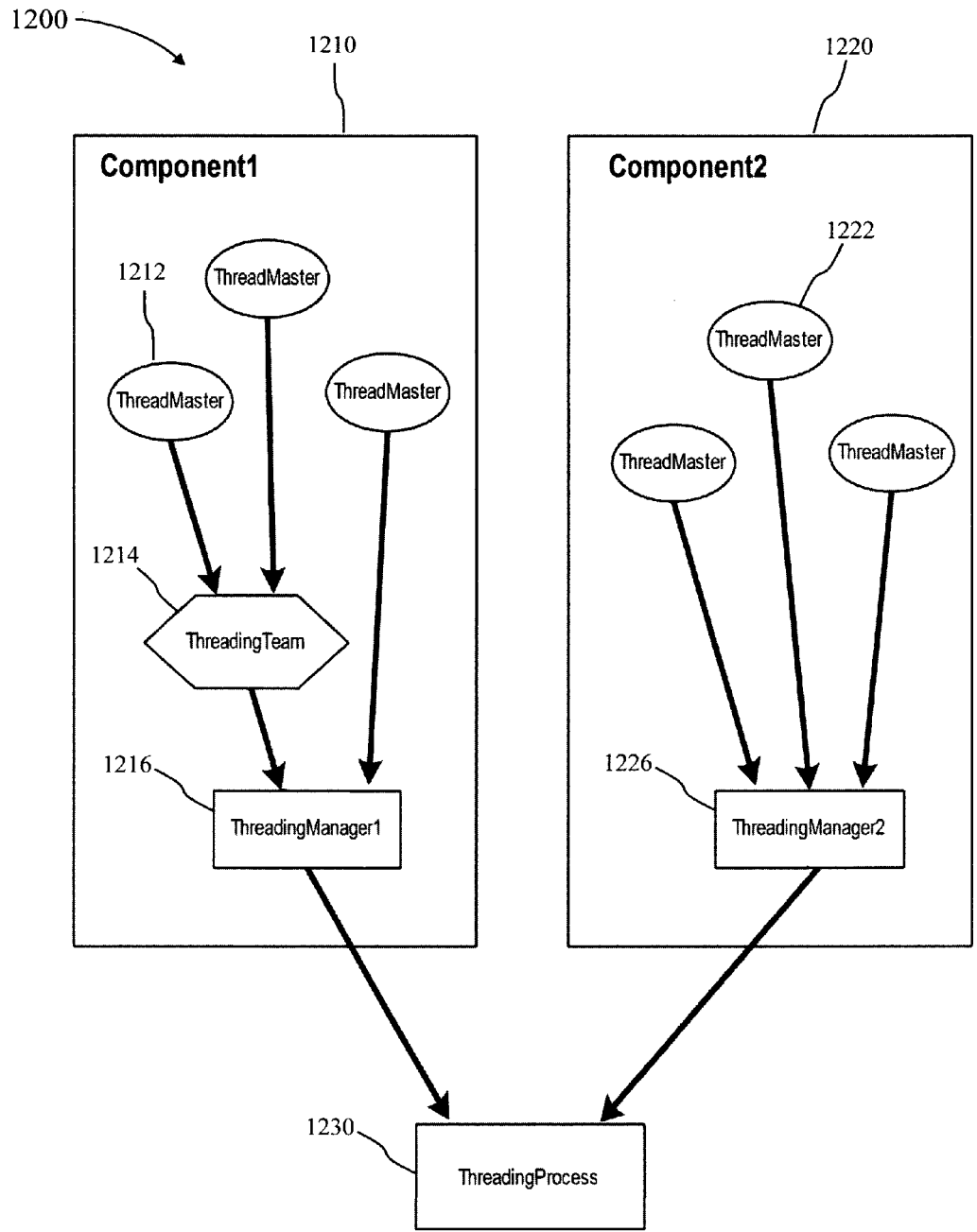
FIG. 12 illustrates a "central post office" algorithm, implemented by a multithreading module.

Reference is now made to FIG. 12, which drawing illustrates a "central post office" algorithm 1200, implemented by a multithreading module.

Each thread of execution should have corresponding thread master 1212. Thread master 1212 represents means for abiding by the memory isolation rule and inherits a thread-safe messaging algorithm. Threads of execution can be organized into one or more teams-of-threads 1214, each team having a shared message queue available for all the threads—team members.

The functionality of team-of-threads is implemented in a threading team 1214. Each specific team-of-threads should be represented with corresponding threading team.

Each threading team 1214 should be registered in a threading manager 1216. Each thread master should to be registered in a threading team or directly in a threading manager. Each thread master and threading team has a complex identifier consisting of string ID and a numeric ID. By the complex identifier each of thread masters and threading teams could be retrieved from the "registry" of the "central post office" any time.

FIG. 12 also illustrates that multiple threading managers are allowed in order to fit multi-component structure of an application. Each component implemented in DLL (for example, COM in-proc server) (1210 and 1220 in the example shown in FIG. 12) can be moved to another process along with the set of threads of execution which threads of execution are run by the component, and along with the thread masters and threading teams registered directly or indirectly in the component-specific threading manager.

FIGS. 13-17 show a number of examples of multithreading scenarios which multithreading scenarios can be easily implemented using the multithreading module.

Figure 13:
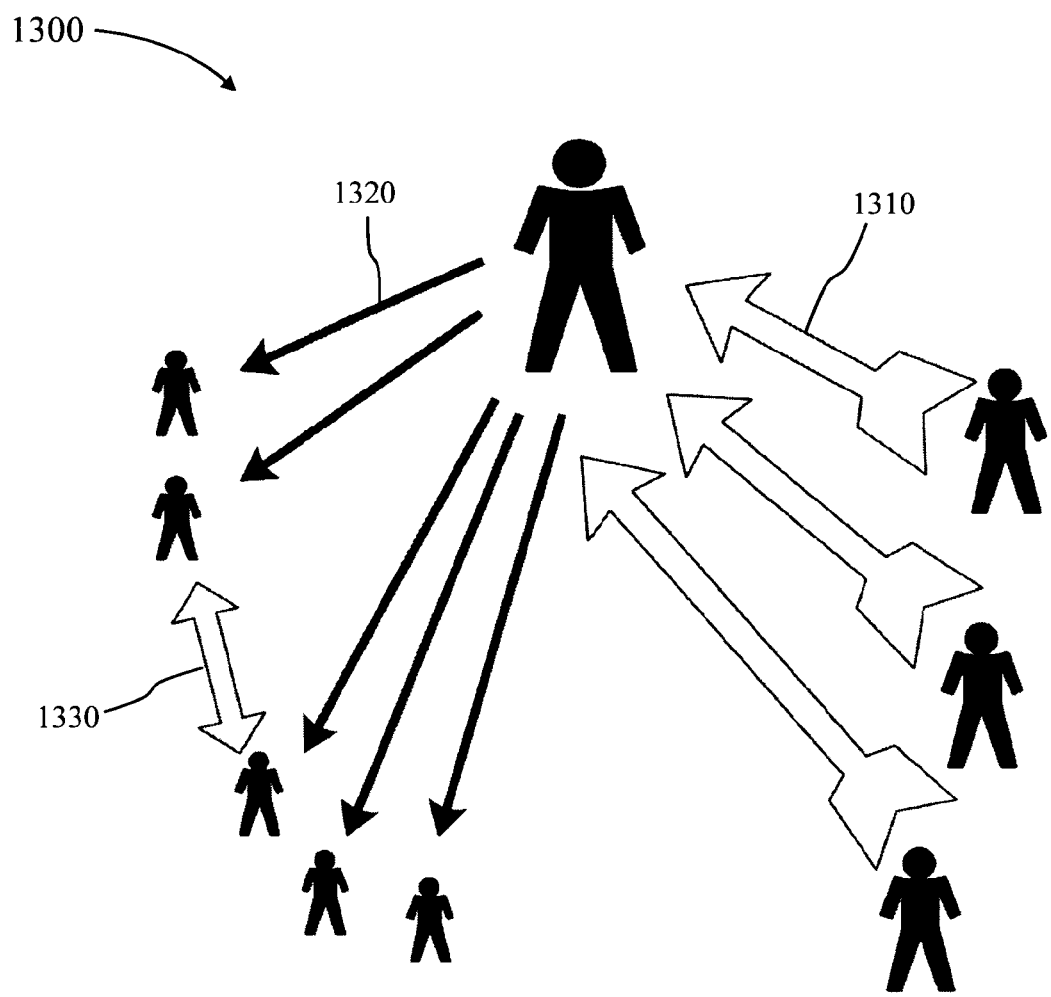
FIGS. 13-17 illustrate example design scenarios utilizing the multithreading module for multithreaded applications, according to embodiments of the present invention.

FIG. 13 shows an example scenario 1300 illustrating one-to-one (1330), one-to-many (1320) and many-to-one (1310) inter-thread communication scenarios. From the view point of the described multithreading module, all the types of communication, appearing in FIG. 13, represent actually the same peer-to-peer communication scenario. Each thread-sender knows for sure what thread-receiver the thread-sender wants to send the message to.

FIG. 14 shows an example scenario 1400, which scenario represents a team of clerks 1410. Each clerk 1412 member of team 1410 has the same functions and is capable of serving any client from the queue 1430 of clients. Each clerk 1412 is implemented as thread of execution in the code. Each client is represented as a message in the code.

Figure 15:
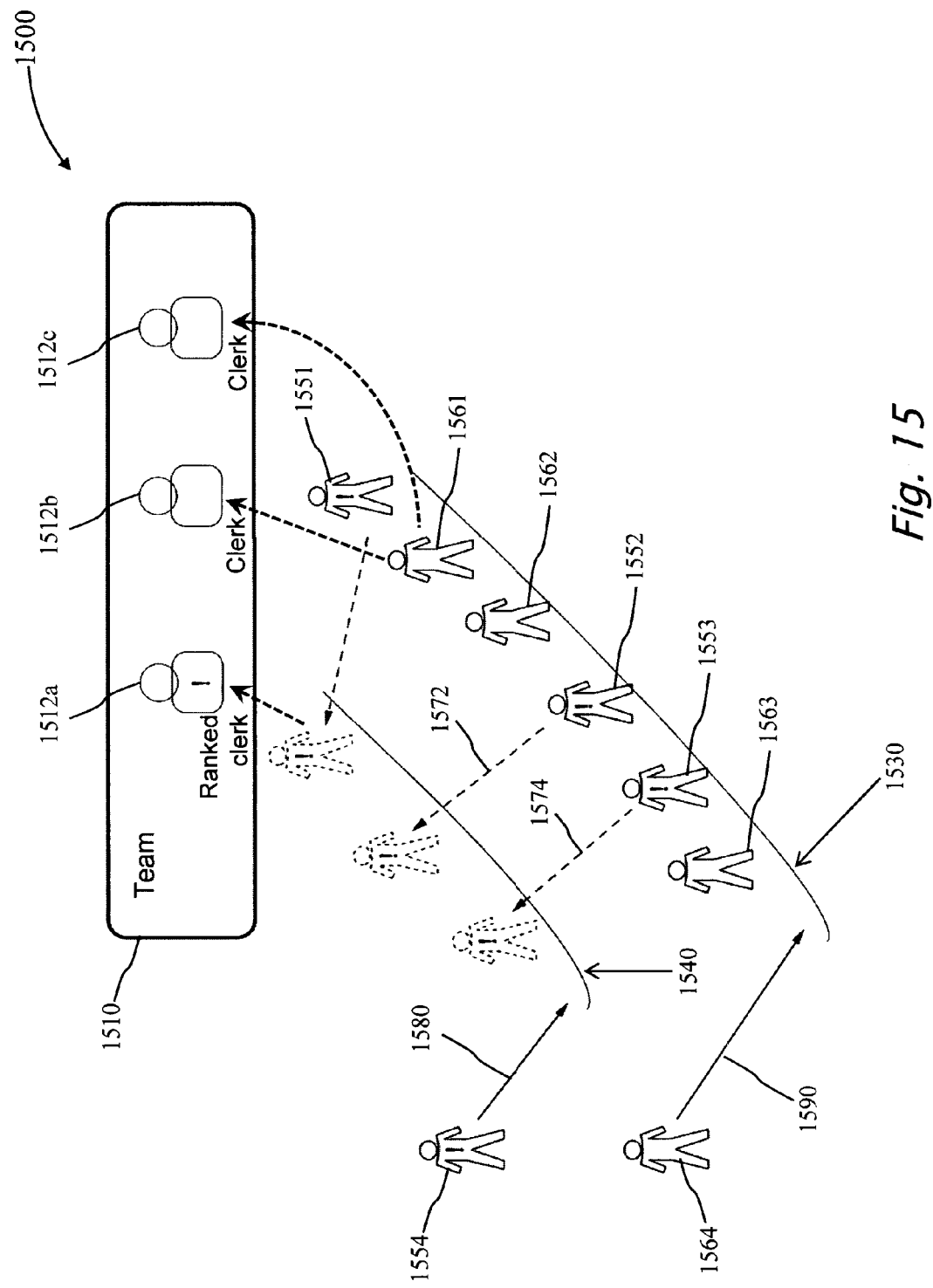

FIG. 15 shows an example scenario 1500, which scenario represents a team of clerks 1510, which clerks—members of the team 1512 have some special ranking, wherein ranked clients can only be served by ranked clerks 1512a. 1530 is a queue of non-ranked clients and 1540 is a queue of ranked clients. 1551, 1552, 1553 and 1554 represent ranked clients and 1561, 1562, 1563 and 1564 represent regular clients. Arrows 1571, 1572 depict the transfer feature: ranked clients move to ranked private queue 1540. Arrow 1580 depicts the redirect feature: a new ranked client 1554 is queued directly into ranked private queue 1540. Arrow 1590 depicts regular queuing into common queue 1530.

In variations of the present invention, it is specified by a user-defined function implementation, whether ranked clerk 1512a is capable of serving different sorts of clients when the clerk gets free.

Clerks 1512a are represented as threads of execution and thread masters and the clients are represented as messages in the code. In order to implement scenario 1500, transfer and redirection features should be used in the code.

Figure 16:
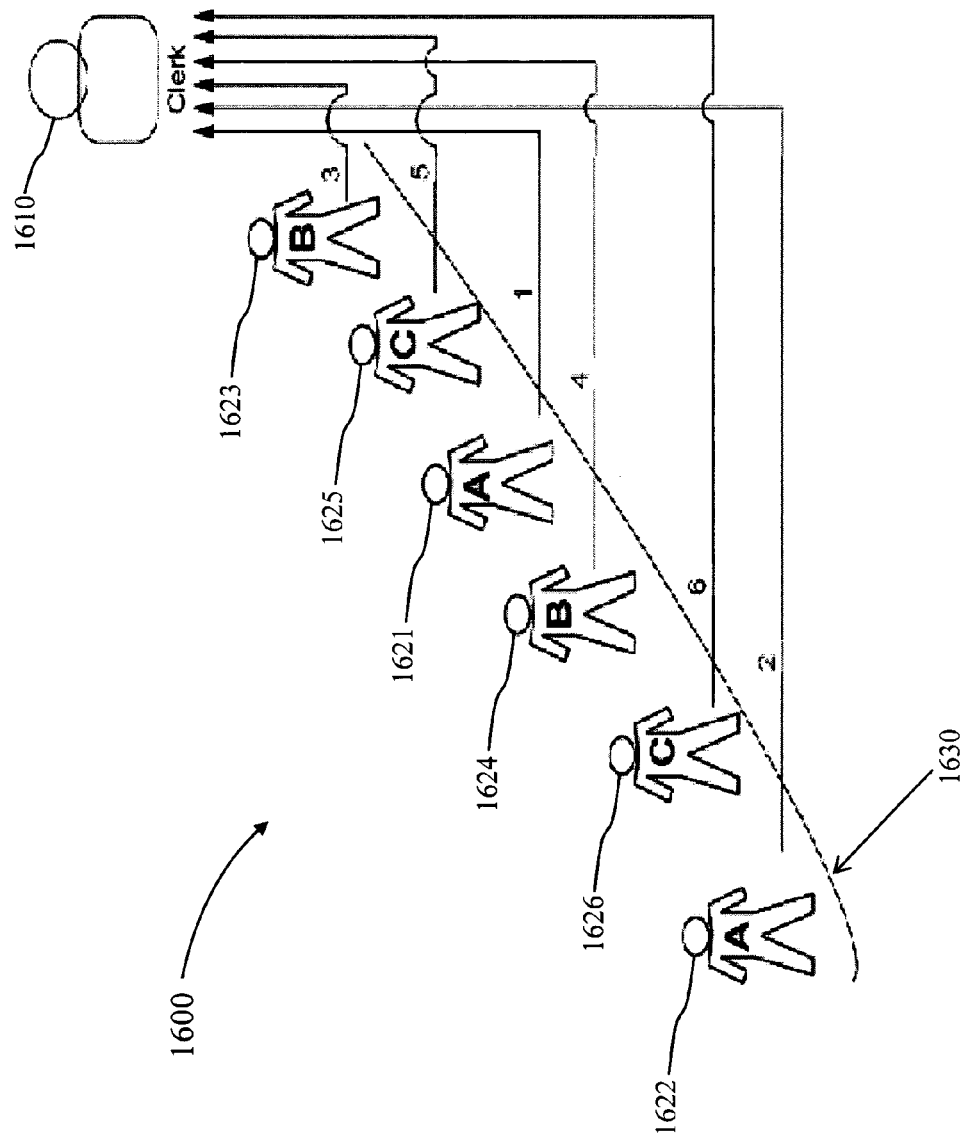

FIG. 16 shows an example scenario 1600, in which scenario each thread-receiver is capable of customizing the order in which order the thread-receiver retrieves the messages from the queue 1630. The customization is implemented by virtual function overriding. 1610 is a clerk. 1621, 1622, 1623, 1624, 1625, 1626 are clients (annotated in the order the clients are served) residing in queue 1630.

Figure 17:
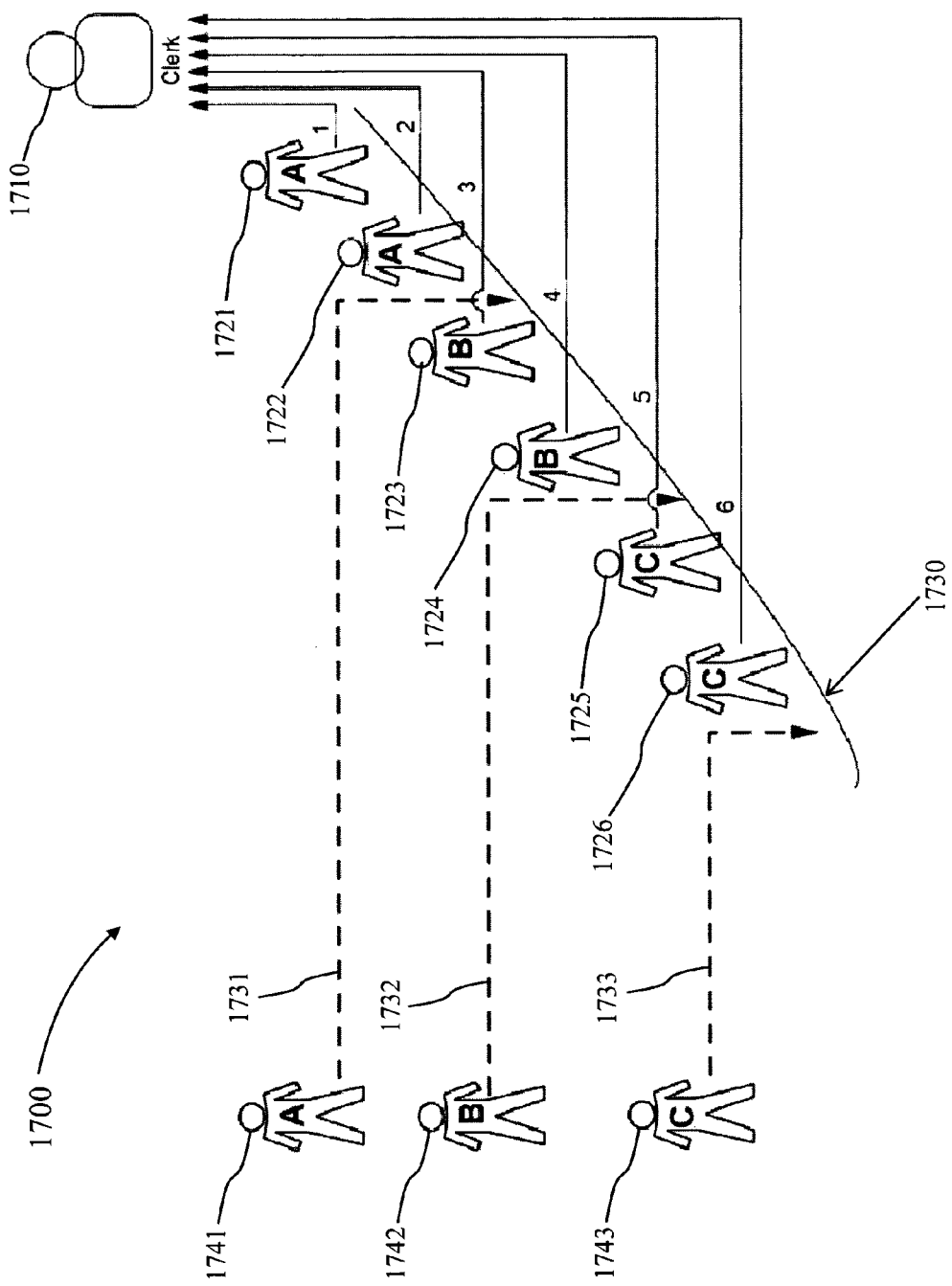

FIG. 17 shows an example scenario 1700, which scenario illustrates usage of a sorted message queue 1730.

1710 is a clerk. 1721, 1722, 1723, 1724, 1725, 1726 are clients (in the order the clients are served). 1741, 1742, 1743 are new clients to be queued and arrows 1731, 1732, 1733 depict where new clients are to be inserted into queue 1730.

Figure 18:
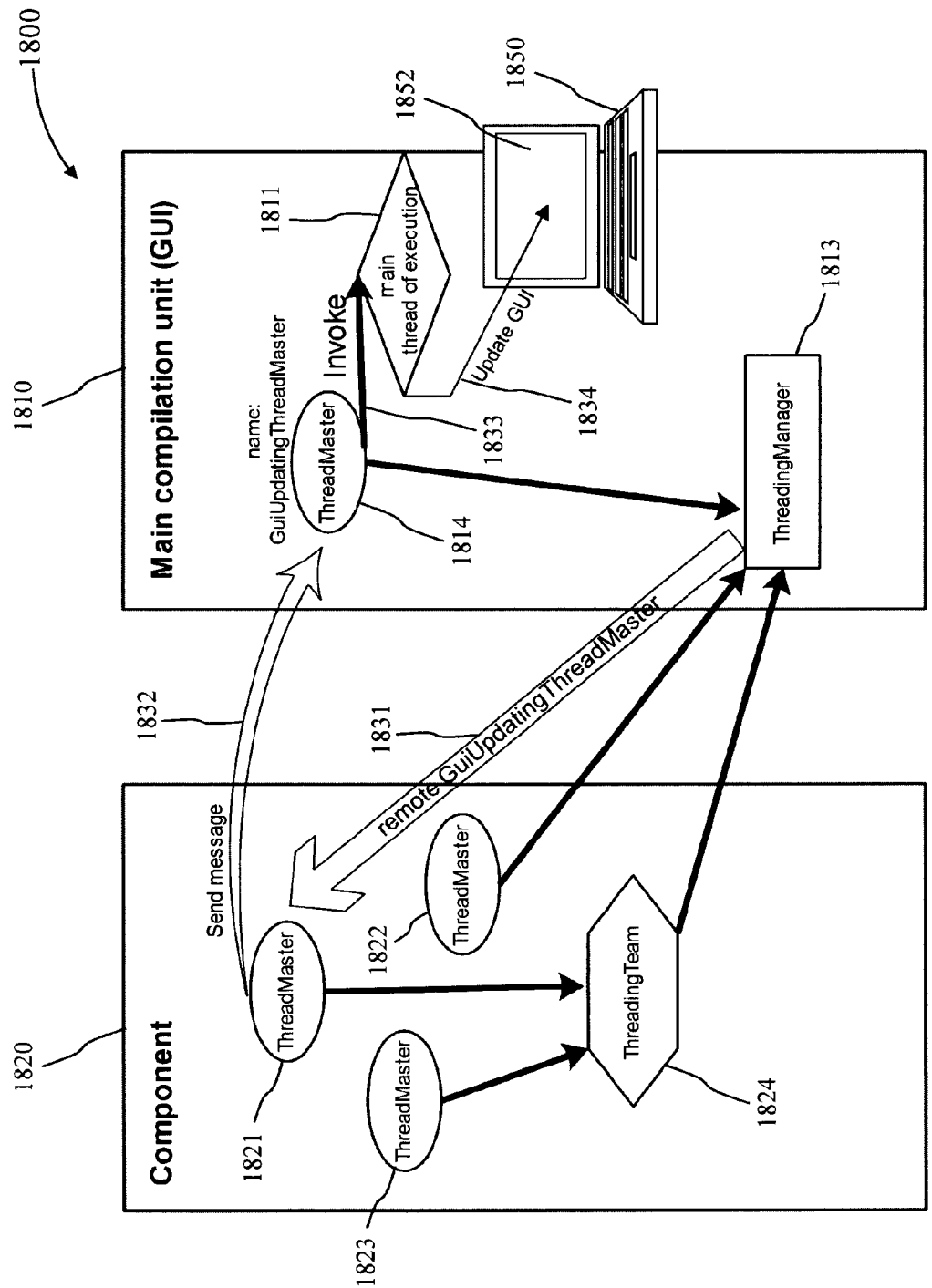
FIG. 18 illustrates important use case utilizing the multithreading module.

Reference is now made to FIG. 18, which drawing illustrates additional important use case of multi-threading module of middleware library of present invention.

FIG. 18 shows an example scenario 1800, in which scenario a component 1820 representing a separate compilation unit desires to update the graphical representation of the application on the screen 1852 of computer 1850. It is assumed that component 1820 has no idea about the data types and GUI controls presenting in the main compilation unit 1810.

1810 is main compilation unit, which main compilation unit runs a main thread of execution 1811 that presenting GUI on screen 1852, creates threading manager 1813 and runs thread of execution using thread master having string ID "GuiUpdatingThread" 1814. Then the object being instance of component 1820 is created by a main compilation unit 1810 from DLL. Upon initialization of the object being instance of component 1820, component 1820 retrieves from threading manager 1813 the thread master having string ID "GuiUpdatingThread" 1814 (arrow 1831).

Component 1820 creates threading team 1824 and thread masters 1821, 1822, 1823. Thread masters 1821 and 1823 are registered in threading team 1824 and thread masters 1822 is registered directly in threading manager 1813.

As one of the threads run by component 1820, for example, thread 1821 desires to update the GUI control on screen 1852, thread 1821 sends a message to the thread master having string ID "GuiUpdatingThread" 1814 (the sending is denoted by arrow 1832).

Upon receiving the message, the thread master having string ID "GuiUpdatingThread" 1814 invokes (1833) a member function of GUI control, which member function is executed on the main thread of execution 1811.

The only information that component 1820 should have in order to implement described use case: the string ID of threading manager and the string ID and numeric ID of special GUI-updating thread master.

If having string ID "GuiUpdatingThread" 1814 thread of execution is not run—nothing happens. Screen 1852 cannot be updated, but the application does not crash.

Furthermore, there are number of virtual functions given for overriding by the user of the multithreading module. The functions overridden by the user of the multithreading module, being called from within Send( ) and Receive( ) functions, provide the user of the multithreading module with full control over optional features implemented within Send( ) and Receive( ) functions of GThreadMaster class.

Workflow charts depicting internals of the Send( ) and Receive( ) functions and describing the functionality of the overridden functions are represented in FIGS. 19-27. The Send( ) function internally calls the Enqueue( ) function on the specified addressee object: receiver thread master or threading team.

Figure 19:
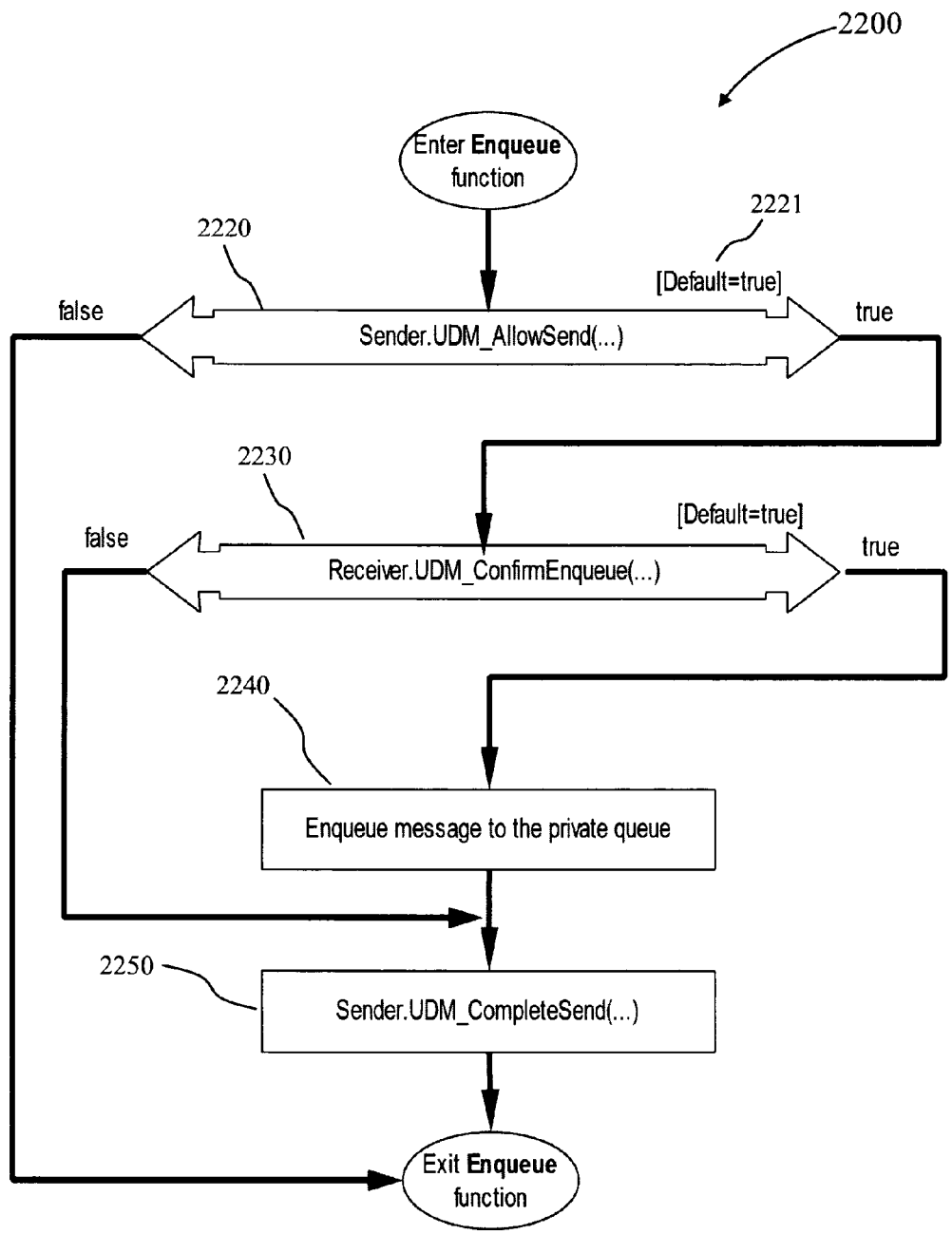
FIGS. 19-27 are block-schemas of messaging algorithm, implemented by multi-threading module of the middleware library of present invention.
Figure 20:
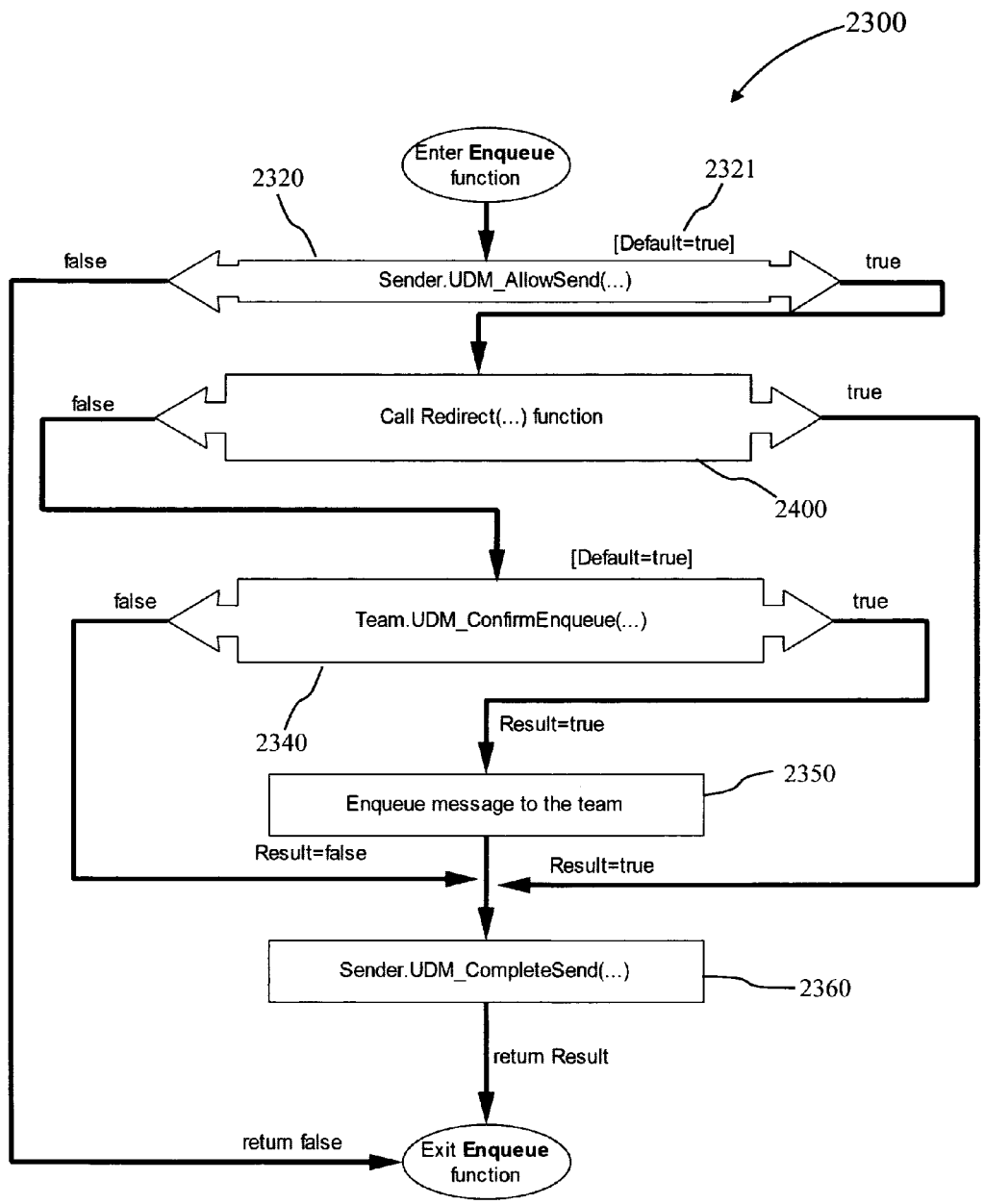

FIGS. 19-20 describe Enqueue( ) functions of thread master and threading team respectively.

FIG. 19 describes an example algorithm 2200 for simple message sending to a stand-alone thread (not a team member).

Block 2220 depicts a call to a Sender.UDM_AllowSend( ) function, which function returns a Boolean value. If the returned value is false, the Send( ) function immediately returns. Item 2221 depicts a default implementation of the function in the base class.

Block 2230 depicts a call to a Receiver.UDM_ConfirmEnqueue( ) function, which function returns a Boolean value. If the returned value is false, no sending occurs, but subsequent call to the Sender.UDM_CompleteSend( ) function 2250 is processed.

Block 2240 depicts action of message queuing.

Block 2250 depicts a call to the Sender.UDM_CompleteSend( ) function. The function doesn't return any value. The function was designed to provide the user of the multithreading module with additional opportunity to intrude into predefined algorithm and perform some actions depending on whether the message was actually queued.

FIG. 20 describes an example algorithm 2300 for message sending to a team-of-threads with optional redirection to one of the members of the team-of-threads.

Block 2320 depicts a call to a Sender.UDM_AllowSend( ) function which function returns a Boolean value. If the returned value is false, the Send( ) function immediately returns. Item 2321 depicts a default implementation of the function in the base class.

Block 2400 depicts a call to Redirect( ) function implementing a redirect feature.

The Redirect( ) function returns a Boolean value which value indicates whether a redirection has actually occurred. The Redirect( ) function is described in details by separate workflow chart in FIG. 21.

Block 2340 depicts call to Receiver.UDM_ConfirmEnqueue( ) function which function returns a Boolean value. The function 2340 is called only if Redirect( ) function returned false. The Redirect( ) function returning false notifies that no redirection actually occurred within the Redirect( ) function. Receiver.UDM_ConfirmEnqueue( ) function is designed to confirm message queuing into the queue of the team-of-threads in the case when no actual redirection occurred. If the returned value of Receiver.UDM_ConfirmEnqueue( ) function is false, no sending occurs, but a subsequent call to a Sender.UDM_CompleteSend( ) function 2360 is processed.

Block 2350 depicts action of message queuing into the queue of the team-of-threads.

Block 2360 depicts call to a Sender.UDM_CompleteSend( ) function. The function doesn't return any value. The call to the Sender.UDM_CompleteSend( ) function provides a user of the multithreading module with additional opportunity to intrude into predefined algorithm and perform some actions depending on whether the message was actually queued (sent).

Figure 21:
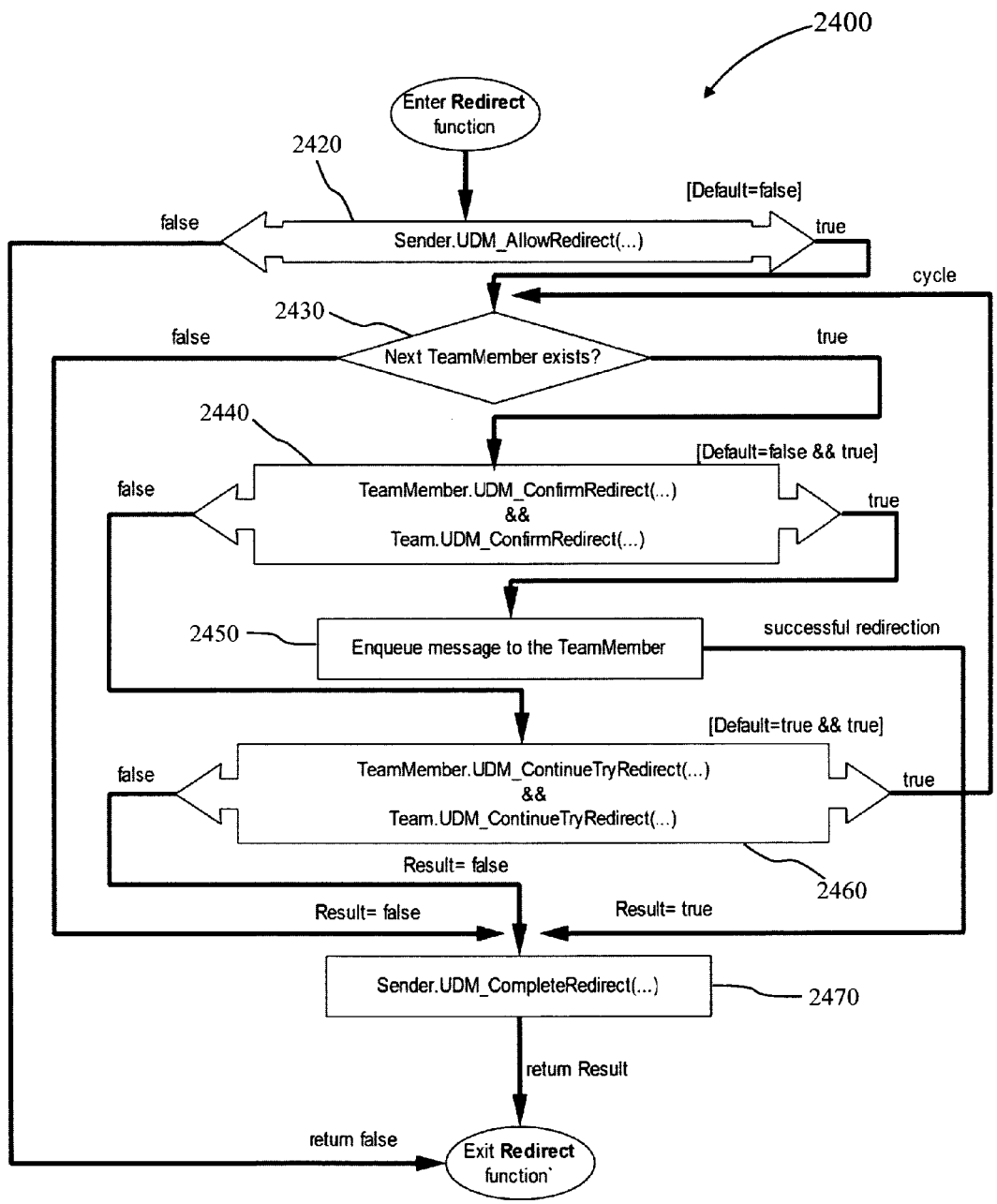

FIG. 21 describes an example internals of Redirect( ) function 2400 implementing the redirect feature.

Block 2420 depicts a call to Sender.UDM_AllowRedirect( ) function, which function returns a Boolean value. If the value, returned by the Sender.UDM_AllowRedirect( ) function, is the false value, the Redirect( ) function immediately returns. Loop control block 2430 depicts the loop exit condition.

Block 2440 depicts call to TeamMember.UDM_ConfirmRedirect( ) and to Team.UDM_ConfirmRedirect( ) functions both returning Boolean values. Only if both of the functions return true, redirection is actually performed—Block 2450. After successful redirection the loop 2430 immediately exits, but the call to the Sender.UDM_CompleteRedirect( ) function 2470 is performed.

Block 2460 depicts call to TeamMember.UDM_ContinueRedirect( ) and to Team.UDM_ContinueRedirect( ) functions both returning Boolean values. Only if both functions return true, redirection loop continues.

Block 2470 depicts call to Sender.UDM_CompleteRedirect( ) function after the loop 2430 finishes. The function Sender.UDM_CompleteRedirect( ) doesn't return any value, but provides a user of the multithreading module with additional opportunity to intrude into a predefined algorithm and perform some actions depending on whether the message was actually redirected.

Figure 22:
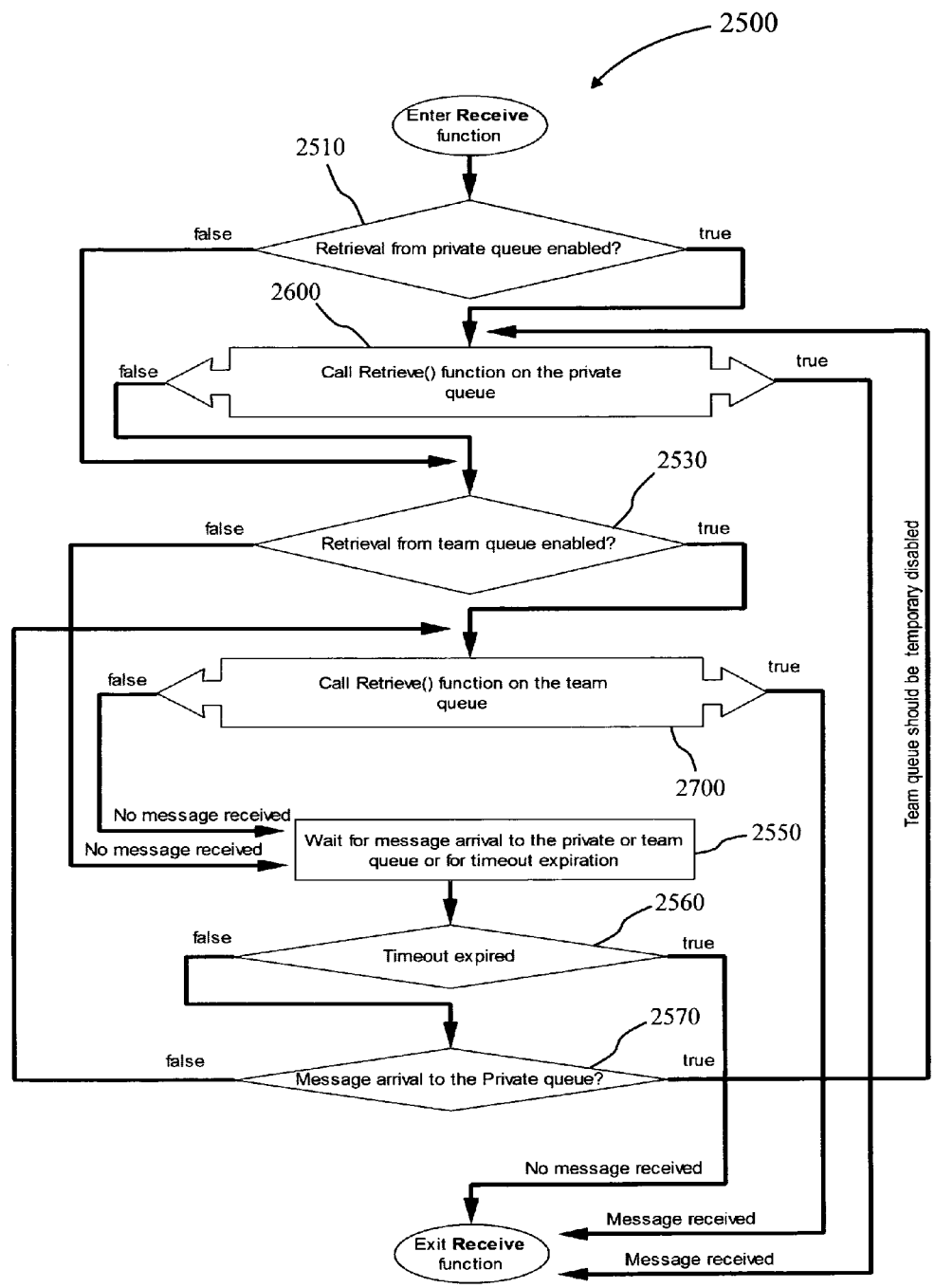

FIG. 22 describes an example algorithm 2500 for message reception.

A thread, being not a team member, can receive a message from the private queue of the thread only. A thread, being a team member, tries to retrieve a message firstly from the private queue of the thread. If no message could be retrieved from the private queue of the thread, then the thread tries to retrieve message from the queue of the team-of-threads. However any queue might be disabled by the user of the multithreading module.

Block 2510 is flow control depicting condition for message retrieval from the private queue.

Block 2600 depicts a Retrieve( ) function call for retrieval from the private queue. Retrieve( ) function for private queue is described in details by separate workflow chart in FIG. 23.

The Retrieve( ) function 2600 returns a Boolean value which value indicates whether message retrieval from the corresponding queue actually occurred.

If message retrieval from the private queue failed and the queue of the team-of-threads is applicable and enabled—the Retrieve( ) function 2700 is called for retrieval from the queue of the team-of-threads.

Block 2530 is flow control depicting condition for message retrieval from the queue of team-of-threads.

Block 2700 depicts a Retrieve( ) function call for retrieval from the queue of the team-of-threads. Retrieve( ) function for queue of team-of-threads is described in details by separate workflow chart in FIG. 24.

If message retrieved neither from private nor from queue of the team-of-threads, thread of execution enters the waiting state up to message arrival or timeout expiration (if final timeout was specified). Block 2550 depicts a waiting state of the thread.

Block 2560 is flow control depicting condition of timeout expiration. If the thread exited waiting state because of timeout expiration, the Receive( ) function returns with no message retrieved.

If the thread of execution exits waiting state because of message arrival—additional retrieval attempt is performed on the queue the message arrived to. There is possible situation, when the arriving message does not fit customized criteria for message acceptation. In the case when the arriving message does not fit customized criteria for message acceptation the message remains in the queue and the thread of execution returns to the waiting state.

Upon successful message retrieval Receive( ) function exits, returning the message.

Figure 23:
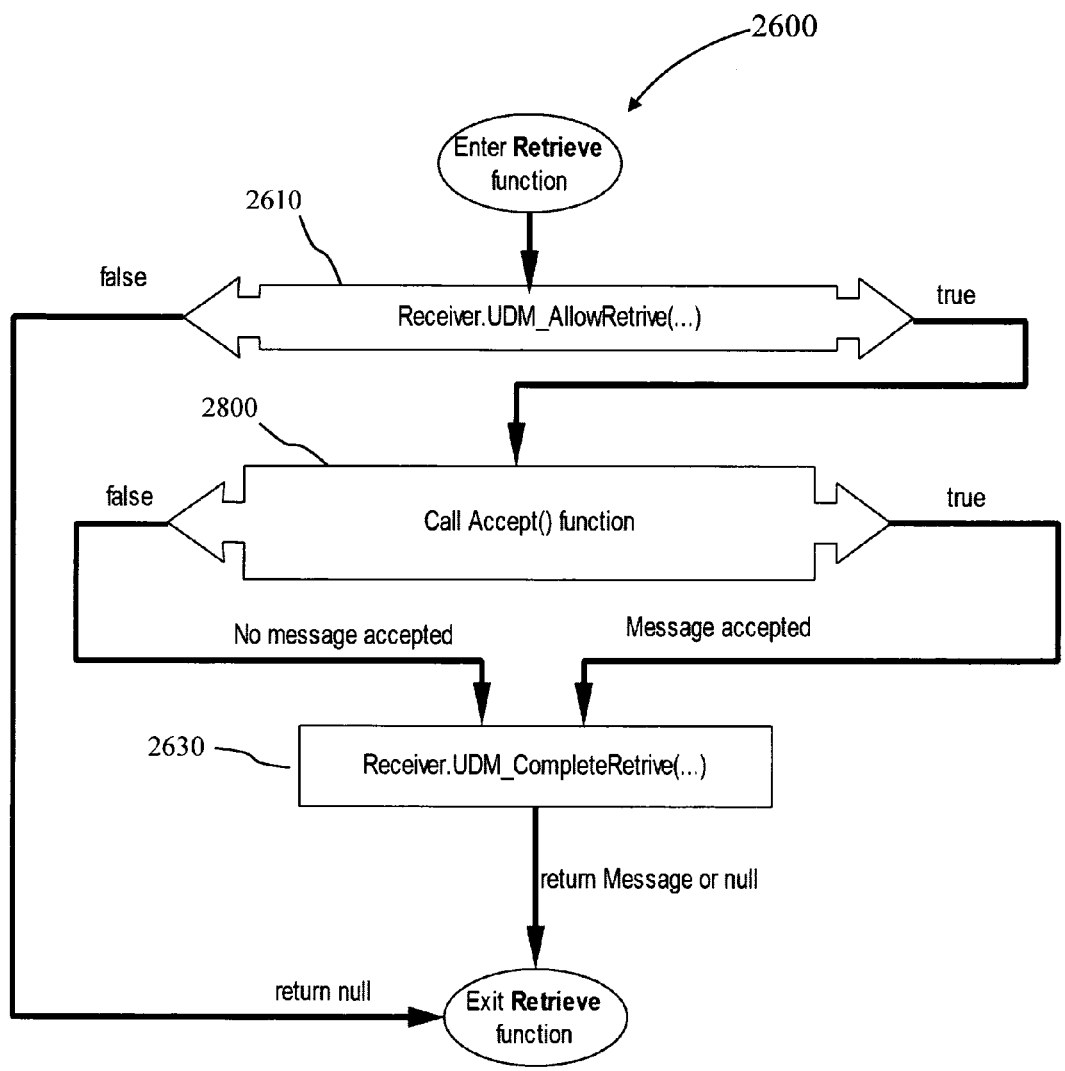
Figure 24:
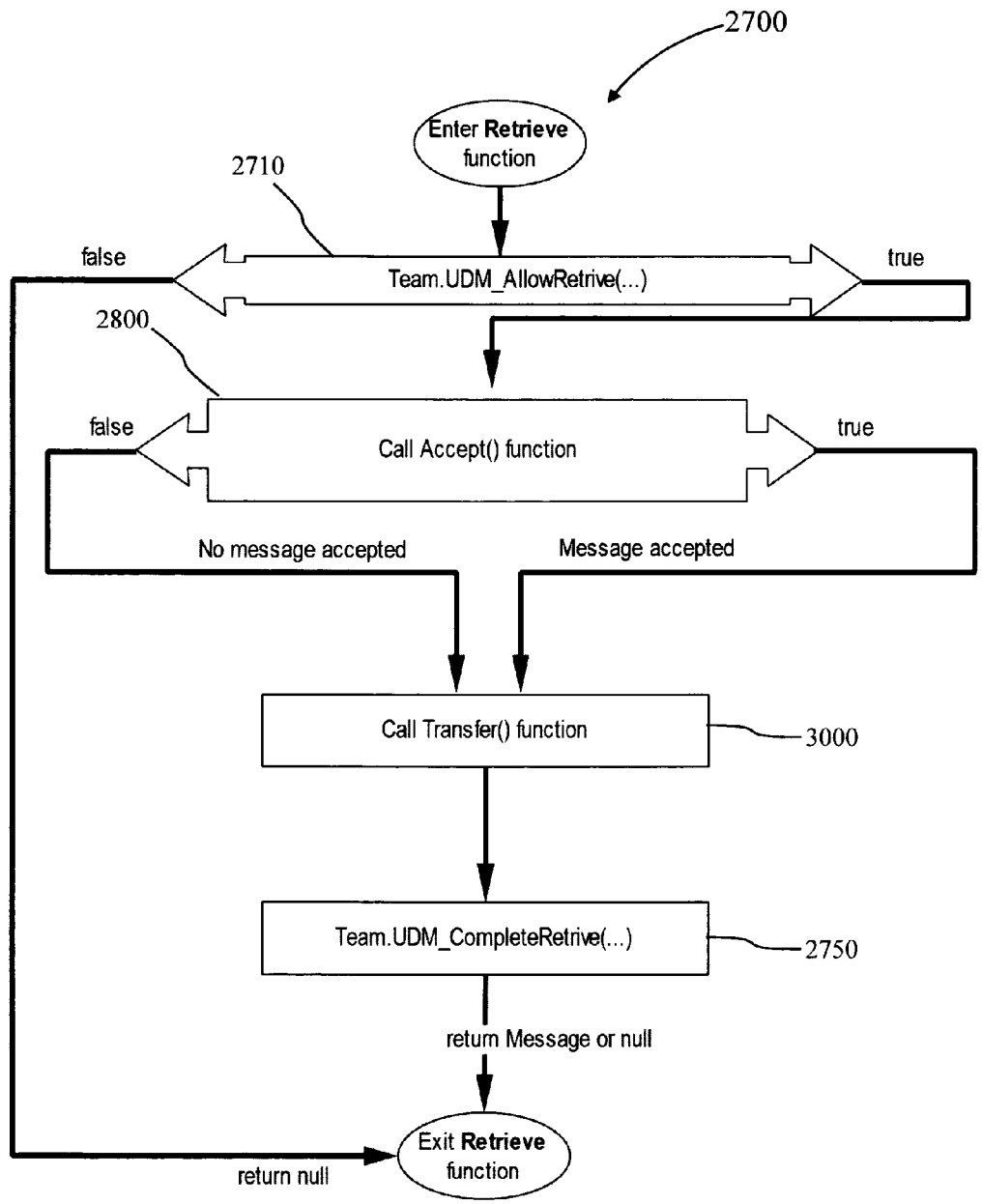

FIG. 23-24 describes example algorithms 2600 and 2700, respectively, for message retrieval, which message retrieval represents a part of the message reception, described by FIG. 22. Algorithm 2600 performs retrieval from a private queue and algorithm 2700 performs retrieval from the queue of a team-of-threads. The only difference is that the retrieval from the queue of the team-of-threads includes an optional transfer feature.

In the FIG. 23, block 2610 depicts a call to Receiver.UDM_AllowRetrieve( ) function, which function returns a Boolean value. If the returned value is false, the Retrieve( ) function 2600 called on a private queue, immediately returns.

Block 2800 depicts an Accept( ) function call that is designed for message acceptation from any queue. The Accept( ) function 2800 returns a Boolean value which value indicates whether message acceptation actually occurred. The Accept( ) function 2800 is described in details by separate workflow chart in FIG. 25

Block 2630 depicts call to Receiver.UDM_CompleteRetrieve( ) function. The call is performed regardless of whether Accept( ) function 2800 actually returned a message. The Receiver.UDM_CompleteRetrieve( ) function doesn't return any value. The function was designed to provide a user of multithreading module with an additional opportunity to intrude into a predefined algorithm and perform some actions depending on whether the message was actually accepted, from a private queue.

In the FIG. 24 block 2710 depicts a call to Team.UDM_AllowRetrieve( ) function, which function returns a Boolean value. If the returned value is false, the Retrieve( ) 2700 function, called on the queue of the team-of-threads, immediately returns.

Block 2720 depicts an Accept( ) function 2800 call for message acceptation from any queue. Accept( ) function 2800 returns a Boolean value which value indicates whether message acceptation actually occurred. Accept( ) function is described in details by separate workflow chart in FIG. 25.

Block 3000 depicts call to a Transfer( ) function implementing the transfer feature. Transfer feature was designed in order to allow for "privatization" (moving to the private queue) of additional messages queued in the queue of the team-of-threads. In most cases criterion for "privatization" of specific message would be based on the content of the recently accepted message. But transfer feature (action) might be actually performed even if no message was recently accepted. The transferred messages are just moved to the private queue. No of transferred messages will be returned by the current Receive( ) function call. Transfer( ) function 3000 is described in details by separate workflow chart in FIG. 27.

Block 2750 depicts a call to a Team.UDM_CompleteRetrieve( ) function. The call to a Team.UDM_CompleteRetrieve( ) function is performed regardless of whether Accept( ) 2800 function actually returned a message. The Team.UDM_CompleteRetrieve( ) function doesn't return any value. The function was designed to provide a user of the multithreading module with additional opportunity to intrude into predefined algorithm and perform some actions depending on whether the message was actually accepted from the queue of the team-of-threads.

Figure 25:
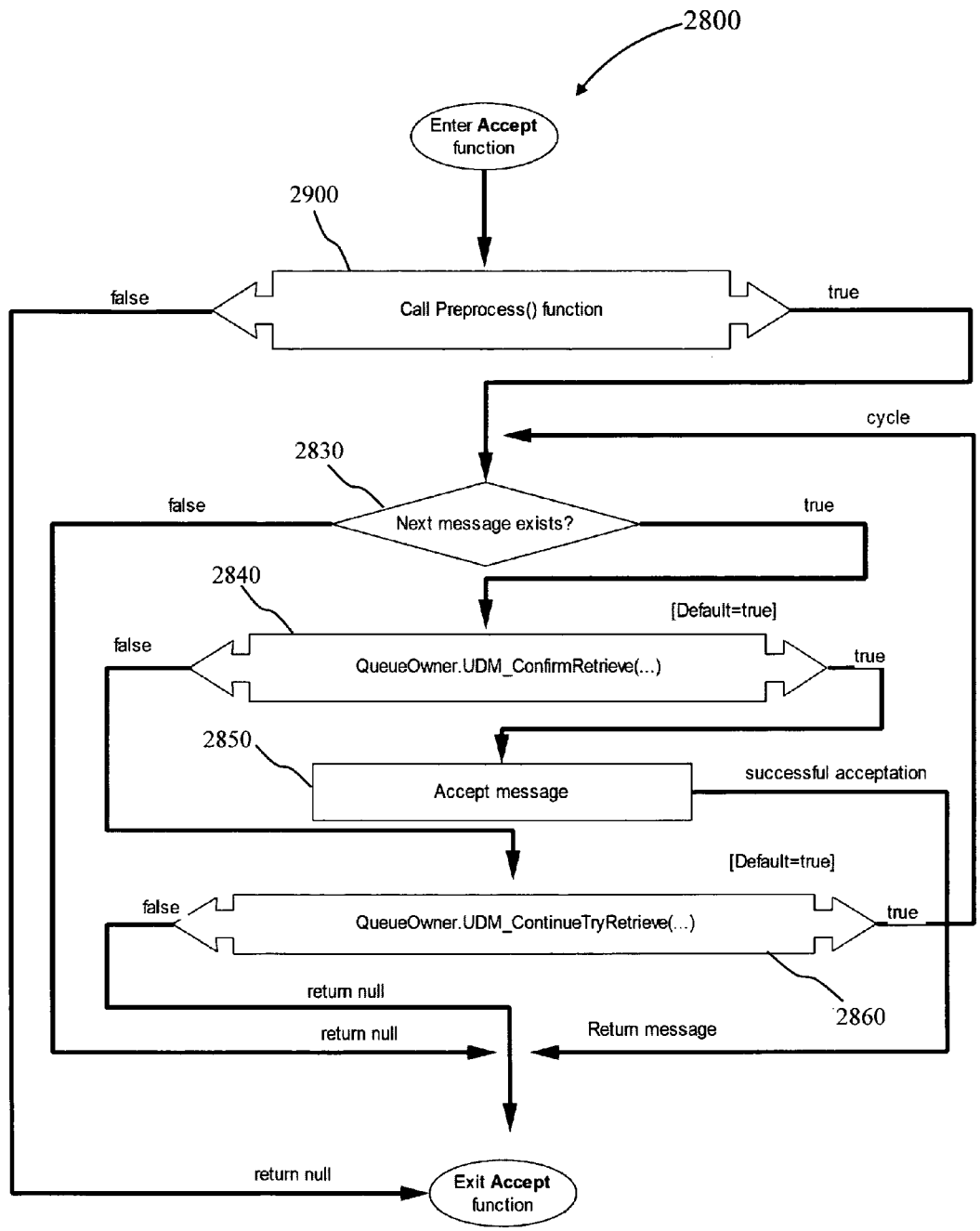

FIG. 25 describes an example algorithm 2800 for the message acceptation, which message acceptation represents a part of the message retrieval described in FIGS. 23-24.

Block 2900 depicts the call to the Preprocess( ) function which function implements an optional preprocess feature.

If Preprocess( ) function 2900 returns false, the Accept( ) function 2800 returns immediately with no message accepted.

Loop control block 2830 is loop exit condition. If in block 2840 default or user-overridden function returns true—the current for the loop 2830 message is picked up for retrieval and stored for returning by block 2850 and loop 2830 exits with success. The loop 2830 might exit with no message accepted from blocks 2830 or 2860.

Block 2860 depicts additional opportunity for the user of the multithreading module to break the loop 2830 and exit with no message accepted.

Figure 26:
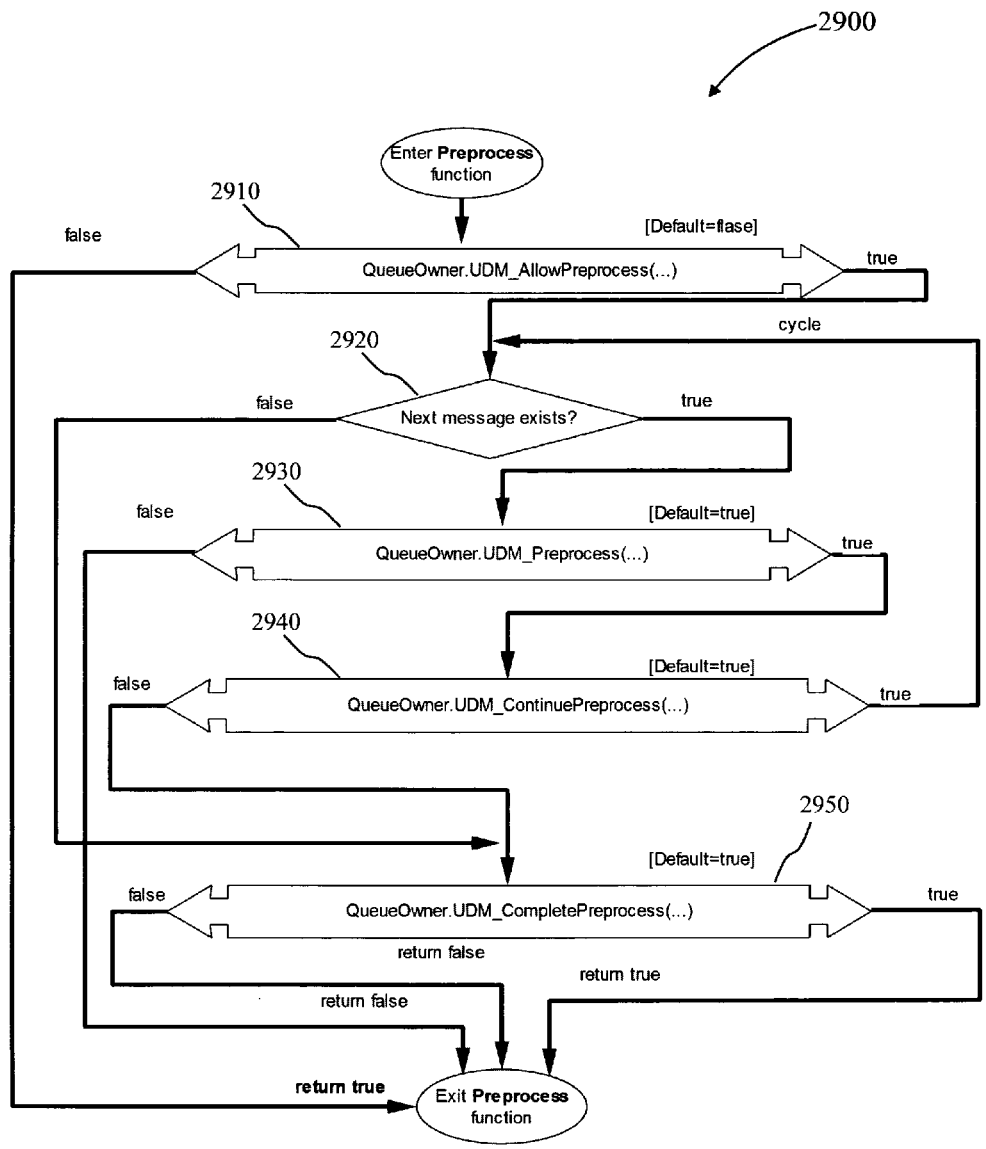

FIG. 26 describes an example internals of Preprocess( ) function 2900 implementing optional preprocess feature. In order to enable preprocess optional feature (2900), the Receiver.UDM_AllowPreprocess( ) function 2910 should return true.

The purpose of the preprocess feature is to provide a criterion for decision making regarding a subsequent message acceptation. It is assumed, that the criterion is based on an integral computation over message queue as whole.

Preprocess( ) function 2900 is called for every (private and team) queue separately from within Accept( ) function 2800 performed for the corresponding queue, which Accept( ) function 2800 is described in FIG. 25.

There are 2 ways to return false from Preprocess( ) function 2900: from UDM_Preprocess( ) function 2930 or from UDM_CompletePreprocess( ) function 2950. UDM_Preprocess( ) function 2930, having returned false, both breaks the preprocessing loop and immediately returns false.

If UDM_Preprocess( ) function 2930 returns true, an integral computation on the queue continues in the case when subsequent call to the UDM_ContinuePreprocess( ) 2940 function returns true. If UDM_ContinuePreprocess( ) 2940 function returns false or the last message in the queue is achieved, a loop control block 2920 exits and UDM_CompletePreprocess( ) function 2950 computes the final integral result of Preprocess( ) 2900 function performing.

Figure 27:
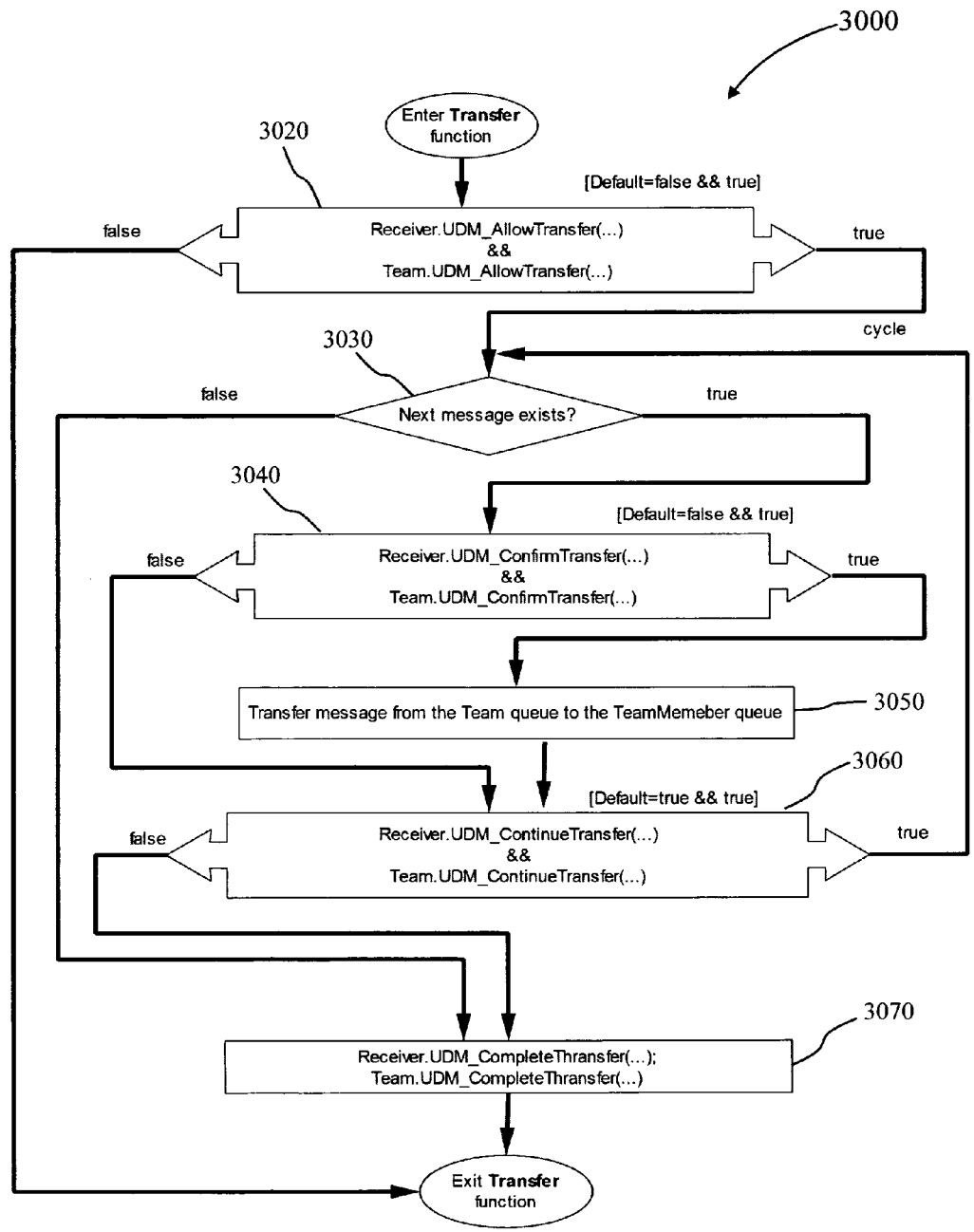

FIG. 27 describes an example algorithm 3000 of Transfer( ) function implementing an optional transfer feature. In order to enable transfer optional feature (3000), both Receiver.UDM_AllowTransfer( ) and Team.UDM_AllowTransfer( ) functions 3020 should return true. Loop control block 3830 is loop exit condition.

In order to actually transfer a specific message, both Receiver.UDM_ConfirmTransfer( ) and Team.UDM_ConfirmTransfer( ) functions 3040 should return true. Block 3050 represents the transfer (moving) of the message from the queue of the team-of-threads to the private queue of the receiver thread master.

As transfer loop 3030 exits Receiver.UDM_CompleteTransfer( ) and Team.UDM_CompleteTransfer( ) functions are called. Transfer( ) function 3000 does not return any value.

FIG. 28 is an example implementation 3100 of a specialized clerk algorithm, presented in code snippets 3110 and 3112. FIG. 28 illustrates how easy complicated scenario could be implemented when using the multithreading module.

The scenario (1500) is illustrated in FIG. 15, where 1512a is the specialized clerk, which specialized clerk 1512a is member of the team 1510. This is why code snippet 3100 contains implementations of 2 classes: TSpecializedClerkThreadMaster derived from the GThreadMaster class and TClerksTeam derived from GThreadingTeam class.

Code portion 3110 is the TSpecializedClerkThreadMaster class implementation.

Function 3120 is the Execute( ) virtual function of the GThreadMaster class, overridden by the TSpecializedClerkThreadMaster class. The Execute( ) represents the root function of corresponding thread of execution.

Almost all the code, implemented in the Execute( ) function 3120 is enclosed within endless cycle 3130.

Code portion 3140 is the Receive( ) function which Receive( ) function receives messages from the queue. There are messages arriving from some "control panel" (maybe GUI) such as "Pause", "SetInterval" and "SetSpecialization", and informational messages from "clients" themselves.

Specifically, "SetSpecialization" message causes a private member of the TSpecializedClerkThreadMaster class (line 3150) to be changed. In order to implement the functionality of the specialized clerk TSpecializedClerkThreadMaster class overrides 3 virtual functions of the GThreadMaster class: UDM_ConfirmTransfer( ) (3170), UDM_ConfirmRedirect( ) (3171) and UDM_AllowTransfer( ) (3172). UDM_AllowTransfer( ) 3172 just enables the optional feature Transfer( ). UDM_ConfirmTransfer( ) 3170 and UDM_ConfirmRedirect( ) 3171 use the private member _Specialization( ) of TSpecializedClerkThreadMaster class 3110 and confirm transfer or redirection correspondingly of the specific message.

The _Specialization member data item belongs to the TSpecializedClerkThreadMaster class. The _Specialization data item is allowed for changing only within workflow of corresponding thread of execution. Since all member functions of the TSpecializedClerkThreadMaster class, which functions use and change the _Specialization data item, are performed on the thread of execution to which thread of execution the object of the TSpecializedClerkThreadMaster class is attached—memory isolation rule is properly abided by and the code is thread-safe. The command to change _Specialization data item is initiated by user via GUI control. Then message is sent from the main thread, which main thread owns all GUI-related memory,—to the thread owning the _Specialization data item.

3150 is the code, processing the message and changing the _Specialization data item. The code 3150 is performed on the thread of execution to which thread of execution the object of TSpecializedClerkThreadMaster class is attached.

Referring to snippet 3112, snippet 3112 is a TClerksTeam class implementation. Function 3990 is an overridden UDM_AllowRedirect( ) function, which UDM_AllowRedirect( ) function enables optional redirection feature of the multithreading module.

Figure 29:
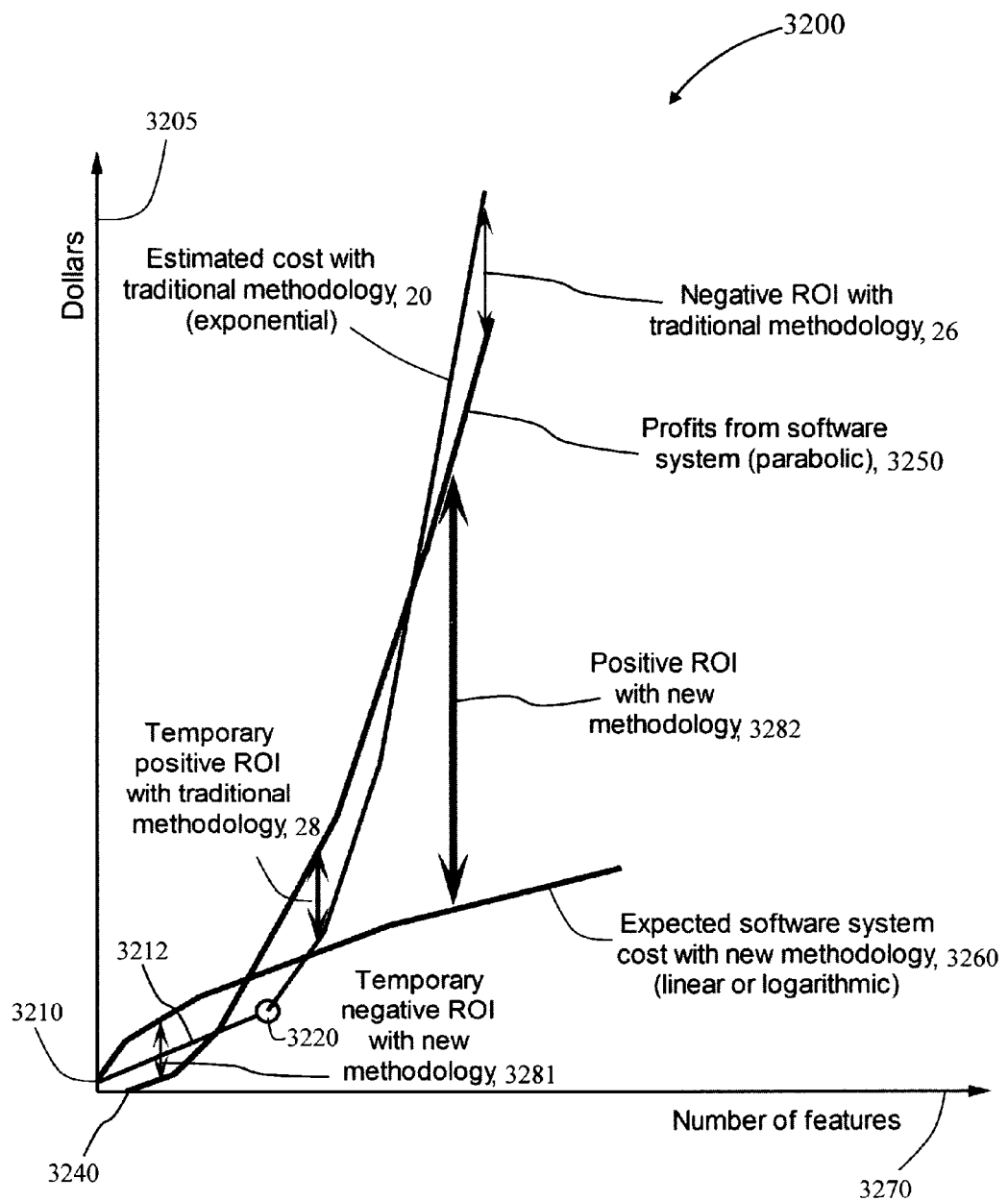
FIG. 29 illustrates expected economical effect of the present invention.

Reference is now made to FIG. 29, which drawing graphically depicts a diagram 3200 of expected economical effect of the present invention. Diagram 3200 includes a vertical "Dollars" axis 3205 vs. horizontal axis "Number of features" 3270 in the computer based software project.

3210 is the starting point of the software project. Some initial investment is required in order to start the development process.

Segment 3212, between points 3210 and 3220, is a straight line representing the development costs growth at the initial stage of the project. Point 3220 represents the event at which point the costs growth line becomes exponential. The curve 20, beginning at point 3220, is exponent depicting development costs growth with traditional methodology.

Curve 3250, starting at point 3240, is a parabolic curve. Curve 3250 represents the expected money income from the software system usage. It is assumed that new features added to the software program system increase the income. This is why the curve is expected to be parabolic.

In prior art, there is a time period when the income surpasses the costs—then a positive ROI (return of investment) can be seen in graph 28. But later the exponentially growing costs outrun the income and the ROI becomes negative forever: see graph 26.

Curve 3260 represents the expected dynamics of costs growth of computer based software system, built according to the methodology of the present invention. Graph 3260 is a logarithmical curve. The cost of changes is reduced in time (with the number of changes to be more precise).

When using introduced computer based software system, built according to the methodology of the present invention, at the first stage, costs surpass the income and ROI is negative: see segment 3281. But later, the income outruns costs and ROI becomes positive forever. The growing gap between graph 3250 and 3260, as represented by arrow 3282, illustrates the great advantage of building a computer based software system, according to the methodology of the present invention.

Training of Programmers

The working time of programmers is commonly acknowledged to be the most expensive resource of software development project.

As was mentioned earlier in the present document, in most cases programmers construct the code unconsciously according to the pattern: "transform requirements directly into working code". Programmers don't implement design decisions. If a programmer retires, knowledge loss is inevitable.

The present invention provides method allowing for forcing programmers to implement design decisions and preventing knowledge loss in the case when programmer leaves.

Programmers should be trained to explain considerations influencing the code construction verbally. The key point is: terms used in the explanation should come from the explanation of the problem to be solved (from the LOT).

Verbal explanations help programmers to create self-explanatory code and help the team leader to understand what programmers—the members of the team of programmers, are being implementing in the code—to understand yet before the code begins to run.

Ability to verbally explain considerations of a person represents criterion for conscious activity of the person.

There are managers training the programmers to think and write code as the manager does, which training represents "intellectual violence". The "intellectual violence" just reduces the productivity of the programmer. As a programmer moves to another team, the programmer would be trained to think another way.

The present invention introduces a universal training methodology, which training methodology makes every programmer professional capable of working efficiently at any team of programmers.

Although the present invention has been described with reference to the preferred embodiment and examples thereof, it will be understood that the invention is not limited to the details thereof. Various substitutions and modifications have suggested in the foregoing description, and other will occur to those of ordinary skill in the art.

Therefore, all such substitutions and modifications are intended to be embraced within the scope of the invention as defined in the following claims.

What is claimed is:

1. A model-oriented programming (MOP) method for computer-based software system development, the method comprising the steps of:
   obtaining the problem specifications of said computer-based software system;
   building a model of said computer-based software system;
   recognizing threads of execution at design stage and appearance of said threads of execution in said model;
   segmenting said model into model segments, wherein each of said model segments is assigned to a programmer;
   manually writing program code for each of said model segments, wherein said program code created by each respective said assigned programmers implements said iteratively updated respective model segment;
   debugging said program code segments by each of said assigned programmers, wherein the expected intermediate values within said program code segment execution are obtained from said model segments, and upon detection of a model error fixing said detected model error and proceeding with segmenting said model into model segments, wherein each of said model segments is assigned to a programmer;
   integrating said code corresponding to each of said model segments into a computer-based software system, wherein said integrated computer-based software substantially implements said iteratively updated model, and upon detection of a model error fixing said detected model error and proceeding with segmenting said model into model segments, wherein each of said model segments is assigned to a programmer;
   delivering said integrated computer-based software to the client;
   maintaining said delivered computer-based software system, wherein said maintenance prolongs said software system development and requires keeping said model up-to-date for all versions of said software system after delivering said software system to the client.

2. The MOP method as in claim 1 further comprising a step of:
   mandatory usage of memory management tools for managing memory allocation and memory freeing as inseparable part of the solution for efficient debugging in languages such as C++.

3. The MOP method as in claim 1 further comprising a step of:
   recognizing teams of threads of execution at design stage and appearance of said teams of threads of execution in said model.

4. The MOP method as in claim 3 further comprising a step of:

abiding memory isolation rules, wherein said rules are configured to logically divide the memory used by application among said threads of execution recognized in said model of application to thereby establish owning thread of execution for every item of memory used by the application.

5. The MOP method as in claim 4 further comprising a step of:
providing a middleware library, wherein said middleware library contains a minimal set of simplification tools indispensable for the methodology feasibility, wherein said minimal set includes:
a simplification tool allowing for simple implementation of new parsers for existing and newly invented formal languages this class is named GStrTokenizer;
a simplification tool allowing for implementation of a personalized design and safe coding of multithreaded applications;
an implementation of parser for a script language allowing for simulation of any input data of any type and any complexity; and
for languages such as C++, said middleware library should contain a tool solving the problem of memory management/ memory leaks in nearly-zero time.

6. The MOP method as in claim 5, wherein said middleware library further includes a GStrTokenizer class representing a powerful tool for simplified implementation of wide range of new parsers, said GStrTokenizer class including:
a complex pointer Cursor;
a complex pointer Separator;
a complex pointer Prefix, wherein said Prefix pointer points to a markup substring located before said token; and
a complex pointer Suffix, wherein said Suffix pointer points to a markup substring after said token,
wherein a token represents a substring to be searched for in an input string,
wherein said Cursor pointer points to the first symbol of a substring of said input string,
wherein said token is searched starting from said first symbol of said substring; and
wherein said Separator pointer points to the first symbol after said token or after markup substring after said token.

7. The MOP method as in claim 6, wherein said middleware library further includes a universally usable multithreading module, wherein said multithreading module encapsulates all required locks within the program code provided in the middleware library, to thereby solve the problem of safe multithreading applications.

8. The MOP method as in claim 7, wherein said multithreading module includes thread-safe module elements, said thread-safe module elements including:
a GThreadMaster class, having a message queue storing incoming messages, wherein the said queue might optionally be defined as sorted, and wherein an object of the class derived from said GThreadMaster class is allocated for each thread of execution;
a GThreadingTeam class implementing a team-of-threads having a common message queue for all threads of execution, being members of said team-of-threads;
a GThreadingManager class, along with said GThreadingTeam class, facilitates performing a thread-safe "central post office registry" algorithm;
a GMessage class, being a base class for all messages to be sent using said "post office registry";
a thread-safe asynchronous messaging interface, wherein when using said messaging algorithm the sender never stacks;
a Send( )function for sending messages;
a Receive( )function for receiving messages;
a thread-to-thread asynchronous message sending; and
a thread-to-team asynchronous message sending.

9. The MOP method as in claim 8, wherein said Send( )function includes a redirection feature, wherein said redirection feature facilitates a thread of execution, said thread of execution being a member of said team-of-threads, to redirect a message designated to said team-of-threads, and queue said message onto a private queue of said member thread of said team-of-threads.

10. The MOP method as in claim 8, wherein said Receive( )function includes a customization feature, wherein said customization feature facilitates setting the order in which messages are retrieved from said private queue and/or from said queue of team-of-threads.

11. The MOP method as in claim 8, wherein said Receive( )function includes a preprocess feature, wherein said preprocess feature facilitates additional looping over said message queue before any message can be selected for retrieval.

12. The MOP method as in claim 8, wherein said Receive( )function includes a transfer feature, wherein said transfer feature, after a message is selected from said message queue of said team-of-threads for retrieval by said Receive( )function called on a thread-member of said team-of-threads, said transfer feature facilitates immediate moving of additional messages from said message queue of said team-of-threads to a private queue of said thread-member of said team-of-threads logically grouping said additional messages along with said message selected for retrieval.

13. The MOP method as in claim 9, wherein said GThreadMaster class includes a set of virtual functions, wherein said virtual functions can be overridden by a user of said multithreading module, wherein said overriding of said virtual functions provides said user with a full control over said redirection, customization, transfer and preprocess features implemented within said Send( )and Receive( )functions.

14. The MOP method as in claim 10, wherein said GThreadMaster class includes a set of virtual functions, wherein said virtual functions can be overridden by a user of said multithreading module, wherein said overriding of said virtual functions provides said user with a full control over said customization feature implemented within said Receive( ) function.

15. The MOP method as in claim 11, wherein said GThreadMaster class includes a set of virtual functions, wherein said virtual functions can be overridden by a user of said multithreading module, wherein said overriding of said virtual functions provides said user with a full control over said preprocess feature implemented within said Receive( ) function.

16. The MOP method as in claim 12, wherein said GThreadMaster class includes a set of virtual functions, wherein said virtual functions can be overridden by a user of said multithreading module, wherein said overriding of said virtual functions provides said user with a full control over said transfer feature implemented within said Receive( ) function.

\* \* \* \* \*